US012373860B2

(12) United States Patent
McEachran et al.

(10) Patent No.: US 12,373,860 B2
(45) Date of Patent: Jul. 29, 2025

(54) METHOD FOR MODELING VISUAL MEDIA CONSUMPTION

(71) Applicant: Yieldmo, Inc., Nashua, NH (US)

(72) Inventors: Mark McEachran, Chicago, IL (US);
Sanzhar Murzakhmetov, Almaty (KZ);
Sergei Izrailev, New York, NY (US);
Alan Krumholz, Kamas, UT (US);
Alex Johnston, Seattle, WA (US);
Mahdi Sadjadi, Chicago, IL (US)

(73) Assignee: Yieldmo, Inc., Nashua, NH (US)

( * ) Notice: Subject to any disclaimer, the term of this patent is extended or adjusted under 35 U.S.C. 154(b) by 0 days.

(21) Appl. No.: 18/375,809

(22) Filed: Oct. 2, 2023

(65) Prior Publication Data

US 2025/0111405 A1   Apr. 3, 2025

Related U.S. Application Data

(63) Continuation-in-part of application No. 17/748,481, filed on May 19, 2022, now abandoned, which is a continuation of application No. 17/190,133, filed on Mar. 2, 2021, now Pat. No. 11,367,103, and a continuation-in-part of application No. 16/933,799, filed on Jul. 20, 2020, now abandoned, which is a continuation of application No. 16/427,303, filed on May 30, 2019, now abandoned.

(60) Provisional application No. 62/984,224, filed on Mar. 2, 2020, provisional application No. 62/787,195, filed on Dec. 31, 2018, provisional application No.
(Continued)

(51) Int. Cl.
G06Q 30/0242   (2023.01)
G06Q 30/0241   (2023.01)

(52) U.S. Cl.
CPC ..... *G06Q 30/0242* (2013.01); *G06Q 30/0277* (2013.01)

(58) Field of Classification Search
CPC .............. G06Q 30/0242; G06Q 30/0277
USPC ................. 705/14.41, 26.3, 14.53
See application file for complete search history.

(56) References Cited

U.S. PATENT DOCUMENTS

| 2014/0337130 | A1* | 11/2014 | Lawson | G06Q 30/0255 |
| | | | | 705/14.53 |
| 2016/0027100 | A1* | 1/2016 | Monkman | G06Q 30/0275 |
| | | | | 705/26.3 |
| 2019/0102820 | A1* | 4/2019 | Gupta | G06Q 30/0251 |

OTHER PUBLICATIONS

Iab, Digital Video In-Stream Ad Format Guidelines, 2016 (Year: 2016).*

* cited by examiner

*Primary Examiner* — Tarek Elchanti
(74) *Attorney, Agent, or Firm* — Run8 Patent Group, LLC; Peter Miller; Leah Raddatz

(57) ABSTRACT

One variation of a method for modeling visual media consumption includes: receiving identification of a slot loaded within a webpage accessed by a computing device and remaining outside a first viewing window of the computing device; characterizing a set of features representative of the slot and comprising an address associated with the webpage; representing characteristics of the set of features in a feature container; characterizing a difference between the feature container and a group of feature containers representing target combinations of feature characteristics predicted to anticipate a target outcome, in a defined for a first campaign; and, based on the difference, serving a first visual media in the first campaign to the computing device (Continued)

for rendering within the slot prior to an event that locates the slot in the viewing window of the computing device.

12 Claims, 5 Drawing Sheets

Related U.S. Application Data

62/787,188, filed on Dec. 31, 2018, provisional application No. 62/694,419, filed on Jul. 5, 2018, provisional application No. 62/678,194, filed on May 30, 2018.

METHOD FOR MODELING VISUAL MEDIA CONSUMPTION

CROSS-REFERENCE TO RELATED APPLICATIONS

This application is a Continuation-in-Part of U.S. patent application Ser. No. 17/748,481, filed on 19 May 2022, which is a continuation of U.S. patent application Ser. No. 17/190,133, filed on 2 Mar. 2021, which claims the benefit of U.S. Provisional Application No. 62/984,224, filed on 2 Mar. 2020, each of which is incorporated in its entirety by this reference.

This application is also a Continuation-in-Part of U.S. patent application Ser. No. 16/933,799, filed on 20 Jul. 2020, which is a continuation of U.S. patent application Ser. No. 16/427,303, filed on 30 May 2019, which claims the benefit of U.S. Provisional Application No. 62/678,194, filed on 30 May 2018, U.S. Provisional Application No. 62/694,419, filed on 5 Jul. 2018, U.S. Provisional Application No. 62/787,188, filed on 31 Dec. 2018, and U.S. Provisional Application No. 62/787,195, filed on 31 Dec. 2018, each of which is incorporated in its entirety by this reference.

TECHNICAL FIELD

This invention relates generally to the field of visual media and more specifically to a new and useful system and method for modeling visual media consumption in the field of visual media.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
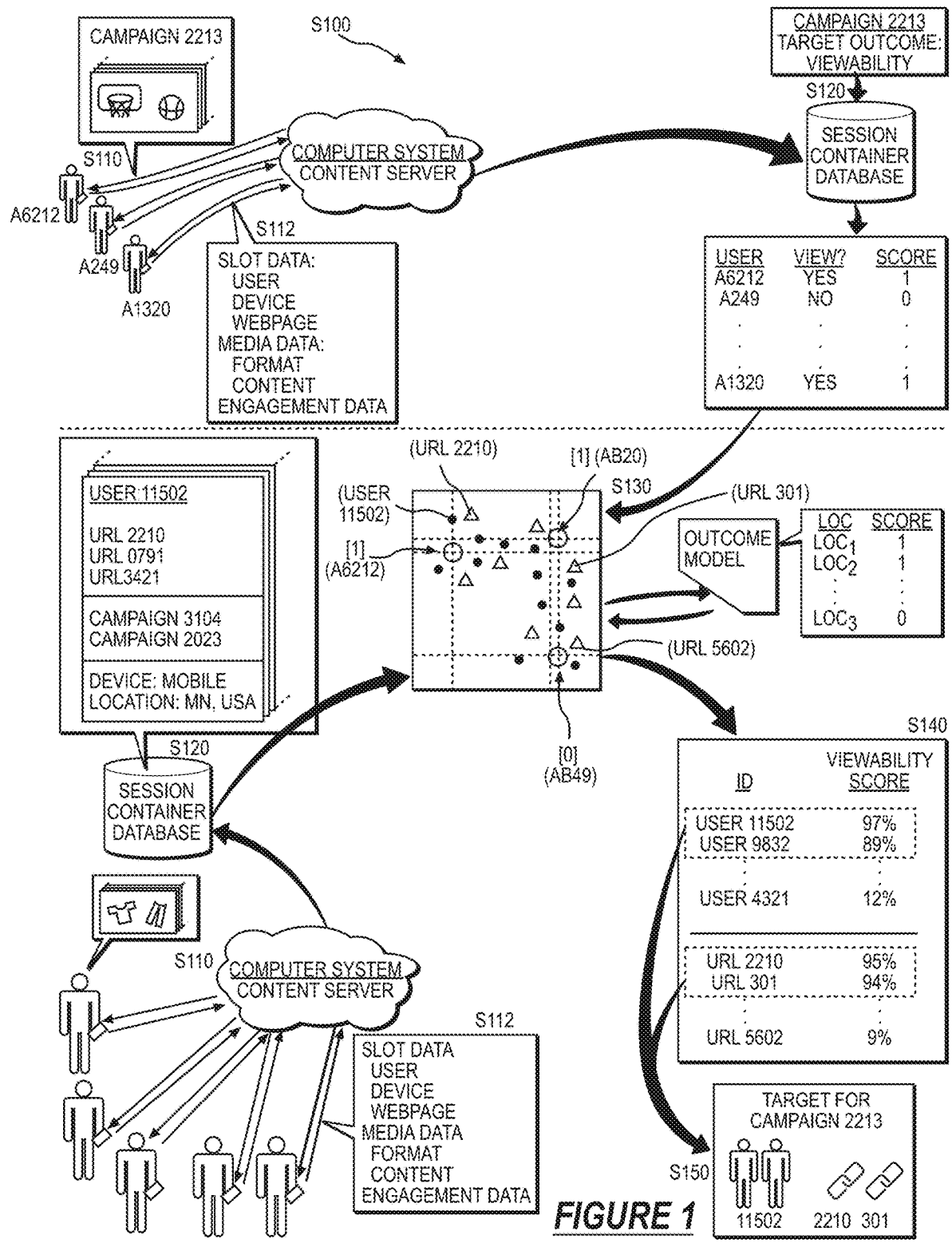
FIG. 1 is a flowchart representation of a method.
Figure 2:
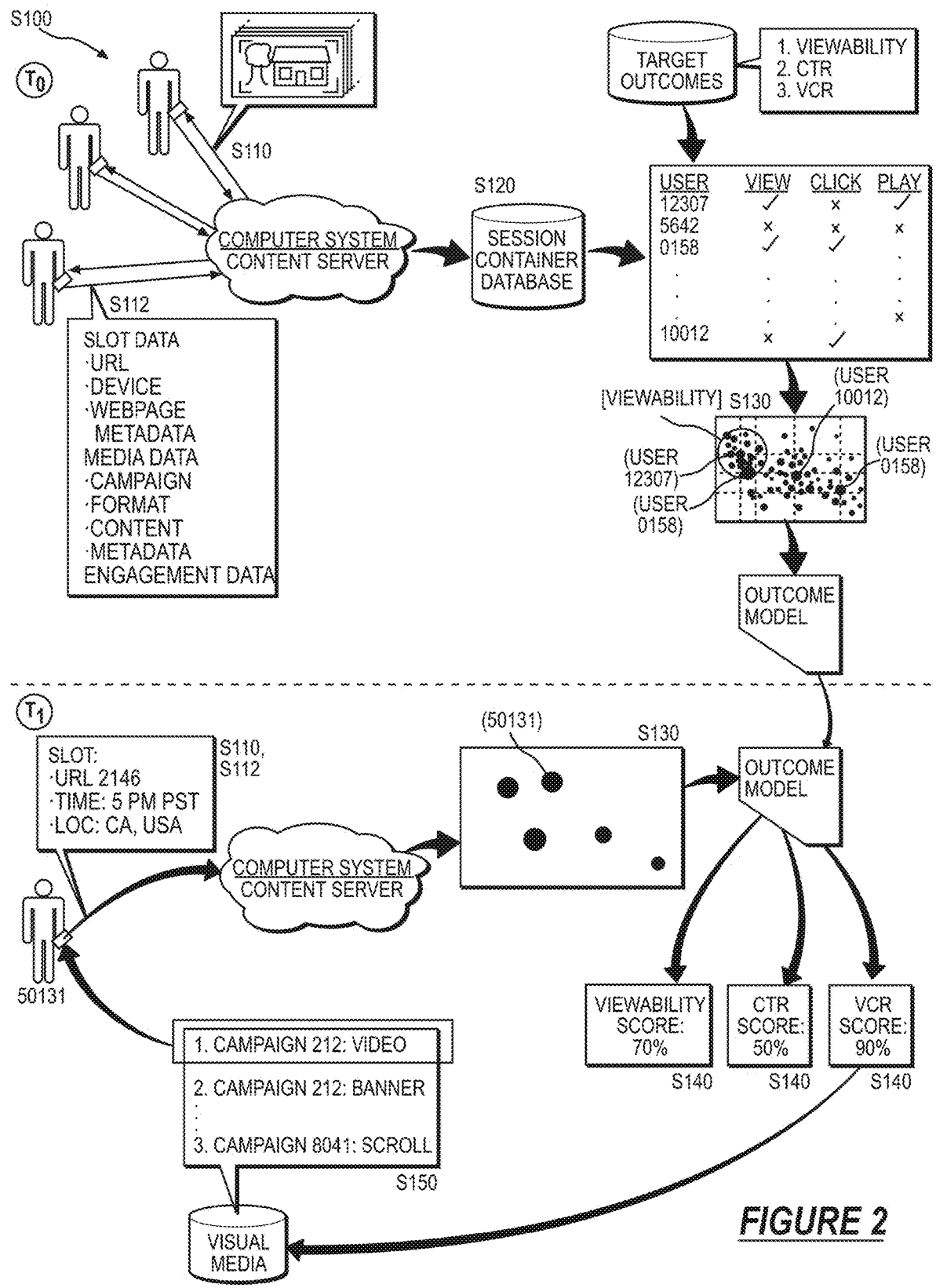
FIG. 2 is a flowchart representation of the method.
Figure 3:
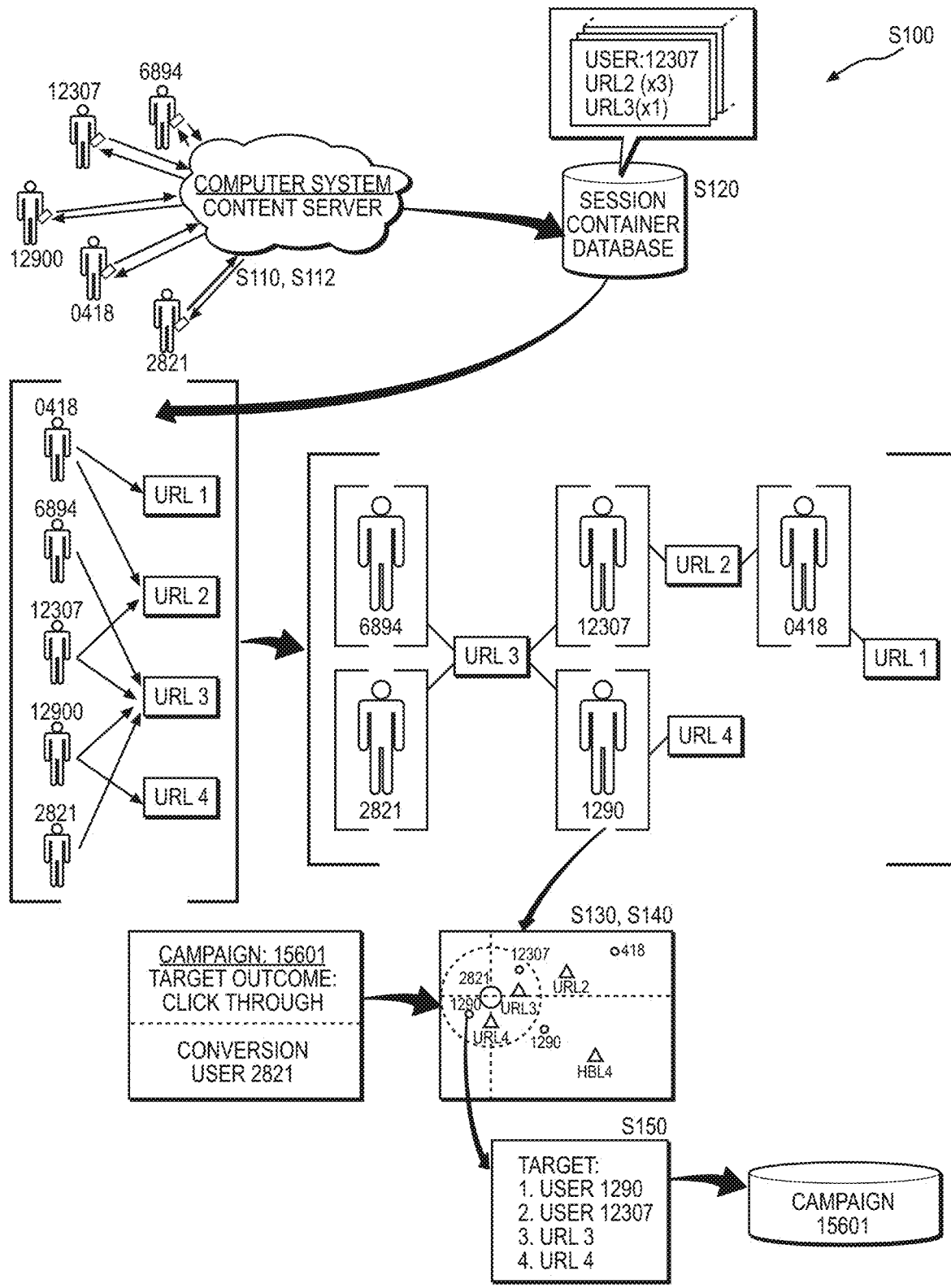
FIG. 3 is a flowchart representation of the method.
Figure 4:
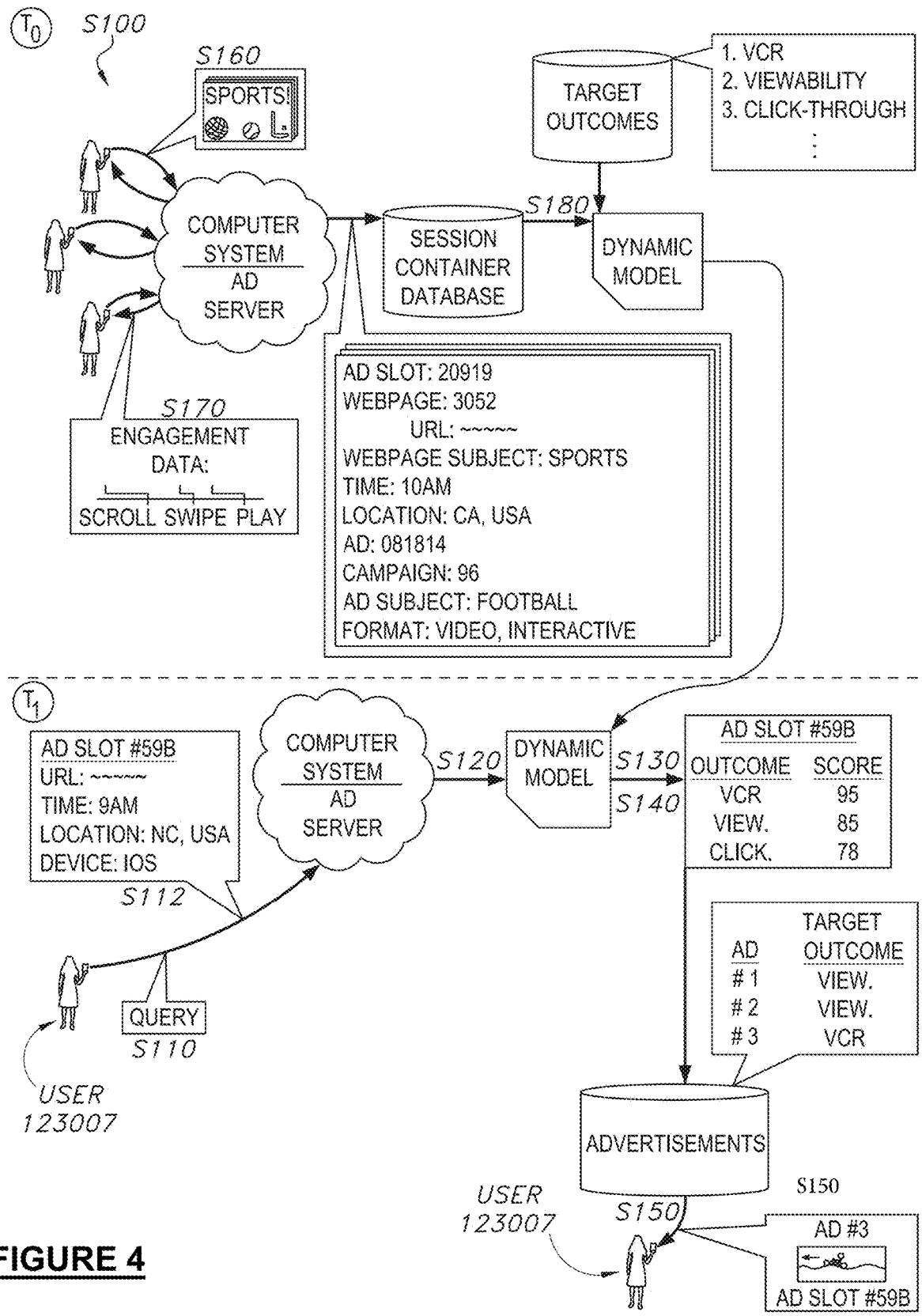
FIG. 4 is a flowchart representation of the method.
Figure 5:
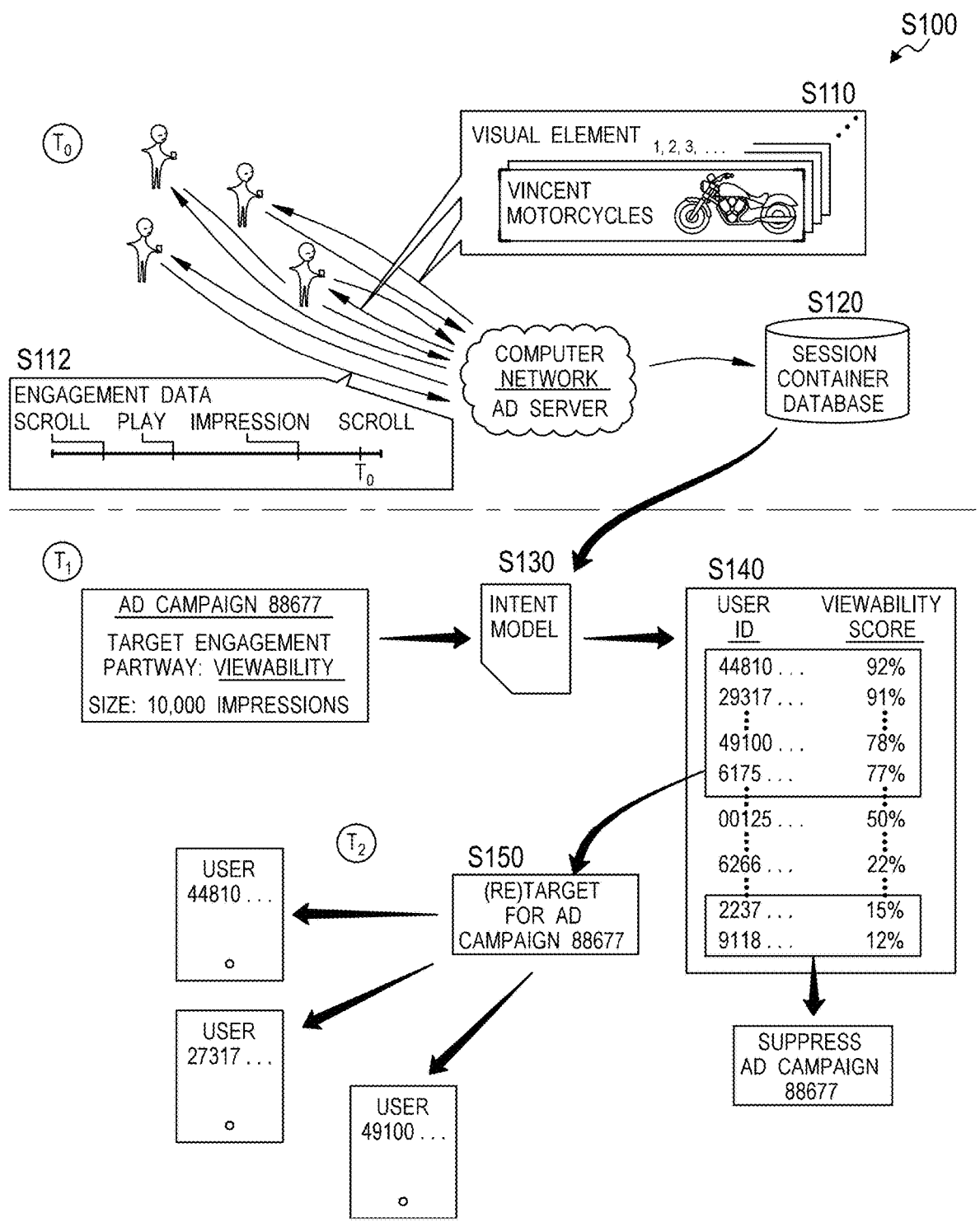
FIG. 5 is a flowchart representation of the method.

As shown in FIGS. 1-5, a method S100 includes, during a first time period: at a first time, receiving identification of a first slot loaded within a first electronic document accessed by a first computing device, the first slot remaining outside a first viewing window of the first computing device and loaded with a default visual media at the first time in Block Silo; characterizing a first set of features representative of the first slot and including a first address associated with the first electronic document and a first set of device characteristics associated with the first computing device in Block S112; representing characteristics of the first set of features in a first feature container associated with the first slot in Block S120; characterizing a first difference between the first feature container and a first group of feature containers representing target combinations of feature characteristics predicted to anticipate a first target outcome, in a set of target outcomes, defined for a first campaign in Block S140; and, based on the first difference, selecting a first visual media, in a first campaign defining the first target outcome, for presentation within the first slot in replacement of the default visual media, and, serving the first visual media to the first computing device for rendering within the first slot prior to an event that locates the first slot in the first viewing window of the first computing device in Block S150.

The method S100 further includes, during a second time period: at a second time, receiving identification of a second slot loaded within a second electronic document accessed by a second computing device, the second slot remaining outside a viewing window of the second computing device at the third time in Block Silo; characterizing a second set of features representative of the second slot and including a second address associated with the second electronic document and a second set of device characteristics associated with the second computing device in Block S112; representing characteristics of the second set of features in a second feature container associated with the second slot in Block S120; characterizing a second difference between the second feature container and the first group of feature containers, the second difference exceeding the first difference in Block S140; and, based on the second difference, rejecting the first visual media for presentation within the second slot in Block S160.

In one variation, the method S100 includes, at a computer system, during a first time period: at a first time, via a computer network, receiving identification of a first slot loaded within a first electronic document accessed by a first computing device accessed by a first user and remote from the computer system, the first slot remaining outside a first viewing window of the first computing device at the first time in Block Silo; receiving a first set of slot characteristics corresponding to the first slot, the first set of slot characteristics including a first address of the first webpage in Block S112; representing the first set of slot characteristics in a first container associated with the first slot in Block S120; representing the first container in a multi-dimensional feature space associated with a first campaign and representing behaviors of a population of users interacting with visual media presented in slots loaded across a population of electronic documents accessed by computing devices of the population of users in Block S130; accessing an outcome model associating locations within the multi-dimensional feature space with a set of target outcomes defined for visual media in a first campaign; predicting a first outcome score for the first slot based on a first location of the first container within the first multi-dimensional feature space and the outcome model, the first outcome score representing a probability of the first user interacting with visual media presented within the first slot according to a first target outcome in the set of target outcomes in Block S140; and, based on the first outcome score, selecting a first visual media, in the first campaign, for presentation to the first user within the first slot, the first visual media defining a first responsive format in a set of responsive formats, and, serving the first visual media, in the first campaign, to the first computing device for rendering within the first slot prior to an event that locates the first slot within the first viewing window of the first computing device in Block S150.

In this variation, the method S100 further includes, at the computer system, during a second time period: at a second time, via the computer network, receiving identification of a second slot loaded within a second electronic document accessed by a second computing device remote from the computer system, the second slot remaining outside a second viewing window of the second computing device at the second time in Block S110; receiving a second set of slot characteristics corresponding to the first slot, the first set of slot characteristics including a first address of the first webpage in Block S112; representing the second set of slot characteristics in a second container associated with the second slot in Block S120; representing the second container in the multi-dimensional feature space associated with the first campaign in Block S130; predicting a second outcome score for the second slot based on a second location of the second container within the multi-dimensional feature space and the outcome model, the second outcome score representing a probability of the second user interacting with visual media presented within the second slot according to the first target outcome in Block S140; and, based on the second outcome score, rejecting the first visual media for presentation within the second slot in Block S160, and, serving a second visual media, in the first campaign, to the second computing device for rendering within the second slot prior to an event that locates the second slot within the second viewing window of the second computing device, the second visual media defining a second responsive format in the set of responsive formats in Block S150.

In one variation, the method S100 includes, at a first time, receiving identification of a first set of slots loaded within a first electronic document accessed by a first computing device, the first set of slots including: a first slot loaded with a first visual media, in a set of visual media, in a first campaign and rendered within a viewing window of a display of the first computing device at the first time, the first campaign defining a first target outcome; and a second slot remaining outside the viewing window at the first time in Block S110. In this variation, the method S100 further includes: accessing a first set of features, representative of the first slot and including a first address associated with the first electronic document in Block S112; accessing a first set of engagement data representing a first set of user interactions with the first visual media presented within the first slot in Block S114; representing the first set of features and the first set of engagement data in a first feature container associated with the first slot in Block S120; accessing an outcome model linking user interactions with the first visual media to user interactions with the set of visual media including a second visual media in the first campaign; and, based on the first feature container and the outcome model, predicting a first outcome score representing a probability of user interactions with visual media, presented within the second slot, corresponding to the first target outcome in Block S140; and, at a second time succeeding the first time, in response to the first outcome score exceeding a threshold outcome score, serving the second visual media to the first computing device for presentation within the second slot prior to an event that locates the second slot within the viewing window of the first computing device in Block S150.

2. Applications

Generally, Blocks of the method S100 can be executed by a remote computer system—such as a remote server functioning as or interfacing with a content server—to: access local device data, received from a local device (e.g., a smartphone, a tablet, a desktop computer), that represents real-time characteristics of the device and/or characteristics of a user interfacing with the local device; leverage these local device data to predict types and degrees of user interactions with visual media (e.g., a particular visual media, a campaign, a particular media formats) inserted into a media slot (hereinafter a "slot")—configured to receive visual media content—loaded within a webpage or in a native application rendered on this local device; match this slot with visual media based on these predicted user interactions, such as based on predicted alignment between a target interaction outcome designated by the visual media and a predicted user interaction for this slot; and then serve this matched visual media to this local device for insertion into this slot in near real-time.

In particular, a content creator (e.g., a brand or advertiser) may designate a particular target outcome for a visual media or a campaign, such as video completion rate (or "VCR") or viewability. The remote computer system can then link achievement of this particular target outcome to a particular interaction type (e.g., scrolls, swipes, gestures, etc.) or to a particular combination of interaction types—performed by users when viewing this visual media or visual media in this campaign—that anticipate this particular target outcome. Over time, the remote computer system can: identify and/or learn slot characteristics (e.g., URL, webpage metadata, location of slot on webpage, time of day, device characteristics, user demographics) that anticipate these interaction types; and then implement Blocks of the method to selectively serve a particular visual media to a slot within a webpage or native application view on a particular local device when characteristics of this local device and slot predict interaction types correlated with the particular target outcome specified by this particular visual media. The remote computer system can similarly identify and/or learn characteristics of visual media, campaigns, media formats, creatives, and/or any other creative variables that anticipate these interaction types.

For example, the remote computer system can: receive a query for visual media from a slot loaded onto a webpage viewed on a user's mobile device; predict interactions between the user and visual media loaded in the slot based on characteristics of the query (e.g., device characteristics, user demographics, a URL, webpage metadata); and selectively serve a visual media—for insertion into this slot—to this mobile device based on alignment between these predicted interactions and a target outcome specified by this visual media. In this example, to predict interactions between the user and this visual media once loaded into the slot on the user's mobile device, the remote computer system can: access historical engagement data for a population of users viewing visual media—on this webpage, on this website, or on media hosted by this publisher—just prior to the current time, around the current time of day, or on the current day of the week; further filter this historical engagement data by device location, slot location, and/or media tags for this webpage; and predict user interactions with visual media loaded into this slot based on these filtered historical interactions, such as without uniquely identifying the user with cookies or accessing other unique user data.

The remote computer system can also generate and maintain an outcome model configured to intake slot characteristics and output predicted outcome scores representative of a predicted degree of interaction between a user and visual media (e.g., representative of an extent to which the user "gave attention" to visual media). The remote computer system can calculate outcome scores as a function of a set of attention metrics (e.g., degrees or duration of interactions of various interaction types), such as: a binary metric defining whether a visual media entered a viewport of a computing device of a user; a view duration metric defining a duration of time a visual media was visible in a viewport of a computing device; a scroll metric defining a number of times a user scrolled back and forth over an visual media; a touch metric defining a number of times a user touched an visual media; and/or a gesture metric defining a number of gestures performed by the user at her mobile device (e.g., to interact with interactive components of an visual media); etc. For example, for a particular visual media designating viewability as a target outcome, the remote computer system can: identify a set of interaction types—including a scroll metric and a view duration metric—that anticipate viewability of the particular visual media; leverage the outcome model to predict durations and/or magnitudes of user interactions of these interaction types with the particular visual media when loaded into a particular slot in a webpage viewed on the user's mobile device based on characteristics of the slot and the particular visual media; and transform these predicted durations and/or magnitudes of user interactions into an outcome score (e.g., 70%, 70/100, 0.700) for the user and the particular visual media. The remote computer system can repeat this process for (many) other visual media queued for distribution, such as within 500 milliseconds of receipt of a visual media query and slot characteristics from the user's mobile device. Based on these predicted outcome scores across this population of visual media, the remote computer system can identity a particular visual media with a greatest likelihood of achieving its target outcome when served to the user and then return a suggestion to a publisher of this webpage (or to an advertiser, an ad server) to serve this particular visual media to this particular slot.

The remote computer system can therefore leverage these outcome scores to: increase probability that users will devote attention to visual media and engage with visual media in a manner that achieves a particular target outcome; improve a visual media experience for users by serving users visual media that users find appealing or interesting; optimize placement of visual media by publishers to increase probability of achieving target outcomes specified by visual media and campaigns, in order to increase publisher revenue; and increase resources allocated by brands toward users who are more likely to engage with visual media while decreasing resources allocated by creatives towards users who are less likely to engage with visual media. Thus, the remote computer system enables publishers and creatives to identify the most valuable impressions (e.g., queries or slots) for particular visual media or campaigns and to allocate resources accordingly.

2.1 Look-Alike Environments

The computer system can leverage characteristics of a set of features defined for the environment—such as characteristics of a URL, a webpage, a slot loaded on a webpage and configured to receive visual media content, a user computing device, etc.—to selectively serve and/or withhold serving of visual media to this environment for a particular campaign. In particular, the computer system can match environments—such as a particular webpage at a particular URL, a particular slot within the particular webpage, and/or a particular computing device accessing the particular webpage—to current or future visual media and/or campaigns based on predicted user interactions with visual media in these campaigns and target outcomes (i.e., types and/or degrees of user interactions) defined for these campaigns.

In one implementation, the computer system defines a multi-dimensional feature space representing behaviors of a population of users across a series of sessions, combinations or orders of these behaviors, and/or visual media, campaign, or webpage metadata. In particular, within this multi-dimensional feature space, the computer system can represent: individual users within the population of users; and individual environments (e.g., URLs)—such as agnostic to user identity—visited by the population of users, such as within a particular sampling period.

The computer system can therefore generate a graphical representation (or "map") of each user's browsing history that defines a population of subregions (e.g., point clouds) containing groups or "clusters" of relatively similar users and URLs predicted to yield similar outcomes when served a particular visual media in a campaign. In one example, the computer system can represent each user, in a population of users, and each URL, in a population of URLs, visited by the population of users within the feature space. By representing both users and URLs in a singular multi-dimensional feature space, the computer system can draw direct comparisons between URLs and users based on locations of these URLs and users within the feature space.

Then, for a particular ad campaign defining a target outcome, the computer system can: identify users represented in feature space and exhibiting target behaviors associated with the target outcome; isolate a set of URLs, in the population of URLs, falling within a threshold distance of these users within the feature space; and leverage an outcome model to score each URL, in the subset of URLs, and thus selectively target a top segment of these URLs—selected from the subset of URLs—corresponding to the highest scores. The computer system can therefore leverage this feature space to rapidly identify environments that are predicted to attract users that exhibit target behaviors associated with the target outcome defined by the campaign.

2.2 Real-Time Predictions

In one implementation, the computer system can implement the outcome model to selectively serve visual media to slots in (near) real-time. In particular, the computer system can match a slot—loaded in an electronic document (e.g., a webpage, a landing page within a native application) accessed by a computing device of a user—to a particular visual media or media campaign based on: characteristics of a set of features defined for the slot, such as including a particular URL containing the slot, webpage metadata, position of the slot within the webpage, a user device type, user demographic data, etc.; and target outcomes (e.g., click-through, viewability, video completion, brand lift) specified for various active visual media or media campaigns.

In response to receiving a request for visual media from a slot accessed by a user computing device, the computer system can characterize these features for the slot and represent characteristics of the slot in a feature container. In particular, the computer system can represent these features as numerical values within slots of a feature container (e.g., a vector, a matrix) defining a quantity of slots corresponding to a quantity of features. By converting these characteristics of the set of features to a set of numerical values, the computer system can: reduce storage requirements by limiting an amount of data stored in these containers; and reduce compute required for making predictions based on these features.

Furthermore, by representing these features as a set of numerical values, the computer system can enable direct comparison between the set of features characterized for a first slot and sets of features characterized for other slots, webpages, computing devices, users, etc. served visual media over time. For example, for a first slot loaded within a first webpage accessed by a user computing device, the computer system can: characterize a first set of features representative of the first slot, such as including a first address (e.g., URL) associated with the first webpage, a first set of webpage metadata (e.g., content type, heading, native images and/or text), a first set of device characteristics associated with the user computing device, etc.; represent characteristics of the first set of features as a first set of numerical values in a first feature container; and—based on the first set of numerical values—project the first feature container into a multi-dimensional feature space representing behaviors of a populations of users and/or URLs served visual media content (e.g., in a particular campaign).

The computer system can then: locate a first region (e.g., a point cloud) within the feature space corresponding to users and URLs exhibiting high engagement according to a first target outcome; locate a second region within the feature space corresponding to users and URLs exhibiting high engagement according to a second target outcome; and/or locate a third region within the feature space corresponding to users and URLs exhibiting high engagement according to a third target outcome. Then, for each target outcome, the computer system can: estimate a distance between the first feature container and a region corresponding to the target outcome; and predict a probability of achieving the target outcome at the first slot based on the distance and a predefined outcome model. The computer system can then selectively match the first slot to a particular target outcome based on this distance (e.g., a dot product, a Euclidean distance) between points (or containers) within the multi-dimensional feature space.

Therefore, by representing features of a particular environment (e.g., a slot, a webpage, a user device)—associated with an inbound query—as a set of numerical values in a container (e.g., a vector, a matrix), the computer system can: enable direct comparison between this particular environment and each other environment and/or user represented in the multi-dimensional feature space; reduce compute required for predictions; and minimize latency between receiving a request for visual media content and serving visual media, thereby enabling real-time prediction and visual media serving.

3. Visual Element

Generally, the computer system can serve visual elements—containing visual media content (e.g., ad content) and configured to record various engagement data and to return these engagement data to the computer system—to user computing devices for insertion into slots within webpages rendered within web browsers executing on these computing devices. In one example, a visual element can include an iframe element that contains static or dynamic (e.g., interactive) visual media and that is configured to be inserted into a webpage, to record various engagement data, and to return these engagement data at a rate of 5 Hz once the visual element is loaded into a webpage rendered in a web browser executing on a computing device, as shown in *FIG. 4.

In this example, the visual element can record: its position in the web browser; a number or proportion of pixels of the visual element in view in the web browser; a running time that a minimum proportion of the visual element has remained in view; a number or instances of clicks on the visual element; vertical scroll events over the webpage; quality of these scroll events; horizontal swipes over the visual element; panes in the visual element viewed or expanded; tilt events and device orientation at the computing device while the visual element was in view in the web browser; number or instances of hotspots selected; instances or duration of video played within the visual element; video pauses and resumes within the visual element or an expanded native video player; time of day; type of content on the webpage or other webpage metadata; and/or a unique user address. The visual element can compile these engagement data into engagement data packets and return one engagement data packet to the computer system once per 200-millisecond interval, such as over the Internet or other computer network.

The visual element can also include an engagement layer, as described in U.S. patent application Ser. No. 16/427,303, filed on 30 May 2019, which is incorporated in its entirety by this reference. The visual element can render a visual media wrapped with or modified by an engagement layer to form an interactive composite visual media that responds to (i.e., changes responsive to) actions occurring on a mobile device, such as scroll, swipe, tilt, or motion events as described below and shown in *FIG. 7. Generally, the visual element can configure an engagement layer to overlay a mobile visual media or configure the engagement layer for placement along one or more edges of a mobile visual media. The visual element can include and/or animate a call to action (hereinafter "CTA"), such as a textual statement or icon configured to persuade a user to perform a particular task, such as purchasing a product, signing up for a newsletter, or clicking-through to a landing page for a brand or product.

In one example, a visual element (e.g., an iframe element) is inserted into a slot on a webpage accessed at a mobile device; and a content server and/or the computer system load a mobile visual media (e.g., creative content arranged statically or dynamically according to a particular media format) and an engagement layer into the visual element as the webpage loads on the mobile device. The visual element then: locates the mobile visual media within the visual element; and locates the engagement layer adjacent one edge (e.g., along a left side, right side, top, or bottom) of the mobile visual media; (animates the mobile device responsive to a visual media coming into view of a viewing window rendered on the mobile device based on interactions specified by the mobile visual media;) and animates the engagement layer based on interactions specified by an engagement layer model. Alternatively, the visual element can: locate the engagement layer along multiple edges (e.g., the bottom and right edges) of the mobile visual media; and locate the mobile visual media over and inset from the engagement layer such that the engagement layer forms a background or perimeter around the mobile visual media.

However, the visual element can define any other file format, can be loaded with visual media of any other type, and can collect and return engagement data of any other type to the computer system in any other way and at any other interval once the visual element is loaded into a webpage rendered within a web browser on a computing device.

4. Session Container

Upon receipt of a set of engagement data packets from a visual element served to a user's computing device, the computer system can compile these engagement data packets into a session container (e.g., representative of a browse session of the user). For example, the computer system can compile engagement data recorded by the visual element from an initial time that the visual element is loaded into the webpage until the webpage is closed (e.g., by navigating to another webpage or closing the web browser) (i.e., a "session, such as up to a duration of thirty minutes) into a multi-dimensional vector representing all behaviors performed by the user within this session, combinations or orders of these behaviors, and/or visual media, content slot, and/or webpage metadata. The computer system can store this session container with a unique address assigned to the user or computing device at which the user viewed this visual media.

The computer system can repeat this process to compile engagement data received from other visual media served to the same computing device (or to the same user, more specifically) over time into a set of session containers linked to this computing device (or to this user specifically). The computer system can further implement this process to build a series of session containers linked to other computing devices (or to other users), in a population of computing devices, based on engagement data received from visual media served to these computing devices over time.

For example, the computer system can: access a first set of engagement data captured by a first visual element containing a first visual media (e.g., a digital ad) and loaded on a first webpage accessed by a first computing device associated with a first user; access a first set of visual media characteristics—such as including a content format (e.g., static image, video, banner), a content category (e.g., sports, health, cars, apparel, home goods, travel), a color scheme, text content, a call-to-action—of the first visual media; access a set of webpage characteristics—such as including a webpage address (e.g., URL, domain), a content category, a content subcategory, an average audience size (or "reach") of the first webpage, a heading, text content, native images and/or videos (e.g., distinct from visual media content), a background color and/or scheme, etc.—corresponding to the first webpage; and/or access a set of device characteristics—such as including a device type (e.g., mobile, desktop), an operating system, a geographic location, etc.—corresponding to the first computing device. The computer system can then: initialize a first session container associated with the first user; represent the first set of engagement data in a first set of slots within the first session container; represent the first set of media characteristics in a second set of slots within the first session container; and represent the first set of webpage characteristics in a third set of slots within the first session container.

The computer system can therefore represent characteristics of a set of features of an environment accessed by the user—such as including a URL, a user computing device, a user or device location, a particular visual media presented to the user, a particular campaign associated with the particular visual media, user engagement with the particular visual media, etc.—within the composite session container.

4.1 Composite Session Container: Browsing History

In one implementation, the computer system can represent a set of browsing data corresponding to a user (or a computing device of the user)—such as representative of a user's browsing history during a particular time period—within a composite session container associated with the user. In particular, the computer system can: extract a set of browsing data—representing a series of webpages, URLs, and/or domains previously accessed by the user (e.g., via the user's computing device)—from a series of session containers associated with the user; and represent the set of browsing data in a composite session container associated with the user.

For example, the computer system can access a set of browsing data associated with the user and specifying: a first URL accessed by the user's computing device at a first time; a second URL accessed by the user's computing device at a second time succeeding the first time; and a third URL accessed by the user's computing device at a third time succeeding the second time. The computer system can then: access a first set of characteristics—including a first domain, a first content category (e.g., sports, travel, home improvement, health), and/or a first heading (e.g., a text heading) presented within a first webpage accessed via the first URL at the first time—of the first URL; access a second set of characteristics—including a second domain, a second content category, and/or a second heading presented within a second webpage accessed via the second URL at the second time—of the second URL; and access a third set of characteristics—including a third domain, a third content category (e.g., sports, travel, home improvement, health), and/or a third heading (e.g., a text heading) presented within a third webpage accessed via the third URL at the third time—of the third URL.

The computer system can then: initialize a session container; represent the first set of characteristics—corresponding to the first URL—within a first set of slots within the session container; represent the second set of characteristics—corresponding to the second URL—within a second set of slots within the session container; and represent the third set of characteristics—corresponding to the third URL—within a third set of slots within the session container. In particular, in this example, the computer system can: convert the first set of characteristics to a first set of numerical values, such as including a first value representative of the first domain, a second value representative of the first content category, and a third value representative of the first heading; convert the second set of characteristics to a second set of numerical values; convert the third set of characteristics to a third set of numerical values; store the first set of numerical values in the first set of slots within the session container; store the second set of numerical values in the second set of slots within the session container; and store the third set of numerical values in the third set of slots within the session container.

In another variation, the computer system can assign a relatively higher weight to URLs visited more frequently by the user. In particular, in this variation, the computer system can: assign a first weight to a first URL visited by a user at a first frequency during a target sampling period (e.g., 1 day, 1 week, 1 month); and assign a second weight—exceeding the first weight—to a second URL visited by the user at a second frequency during the target sampling period, the second frequency exceeding the first frequency. For example, the computer system can: assign a highest weight (e.g., 2×, 10×, 50×) to URLs visited by the user at a first frequency exceeding a target threshold frequency (e.g., 5 visits, 10 visits, 100 visits) within the target sampling period; assign a moderate weight (e.g., 1×, 1.5×, 5×) to URLs visited by the user at a second frequency exceeding a lower threshold frequency (e.g., 1 visit, 3 visits, 5 visits) and falling below the target threshold frequency; and assign a lowest weight (e.g., 0.1×, 0.5×, 1×) to URLs visited by the user at a third frequency less than the lower threshold frequency, such as URLs visited once by the user during the target sampling period.

In another variation, the computer system can assign a relatively higher weight to URLs visited more recently by the user. In particular, in this variation, the computer system can: assign a first weight to a first URL visited by a user at a first time; and assign a second weight—exceeding the first weight—to a second URL visited by a user at a second time succeeding the first time. For example, the computer system can: assign a high weight (e.g., 2×, 10×, 50×) to URLs visited by the user within a current and/or immediately preceding (e.g., within 10 seconds, 1 minute, 1 hour) browse session (sensor unit); assign a moderate weight (e.g., 1×, 1.5×, 5×) to URLs visited by the user within the previous day, week, or month; and assign a low weight (e.g., 0.1×, 0.5×, 1×) to all other URLs previously-visited by the user, such as within the previous year or years.

In this implementation, the computer system can similarly represent additional information—such as including characteristics of visual media (e.g., format, text, imagery, colors) presented to the user at these URLs, characteristics of media slots (e.g., a webpage containing the media slot, a location within the webpage, a size) containing these visual media, characteristics of webpages corresponding to these URLs, characteristics of the user's computing device (e.g., mobile or desktop, operating system, location), and/or available engagement data (e.g., clicks, views, video completion, conversions) of users viewing these visual media—within the session container. The computer system can therefore represent characteristics of the set of features—including a URL, a user computing device, a user or device location, a particular visual media presented to the user, a particular campaign associated with the particular visual media, user engagement with the particular visual media, etc.—within the composite session container.

5. Feature Space

In one variation, the computer system can define a multi-dimensional feature space (hereinafter a "feature space") representing all behaviors performed by a population of users across a series of sessions, combinations or orders of these behaviors, and/or visual media, campaign, or webpage metadata.

In particular, the computer system can: generate a feature space defining a graphical representation of user behaviors; access a composite session container, in a population of composite session containers, generated for a user (e.g., as described above); and, based on values (e.g., numerical values) stored in the composite session container—representing the user's browsing history, visual media consumed by the user, and/or characteristics of environments (e.g., webpages, slots) hosting these visual media—project the composite session container into the feature space.

The computer system can generate axes within the feature space corresponding to each feature, in the set of features, represented in the composite session container. For example, the computer system can: define a first set of axes—representing a domain, a content category, a set of text, and/or a set of images—for a URL feature; define a second set of axes—representing a format, a content category, a call-to-action, a color scheme, imagery, and/or text—for a visual media feature; and generate a third set of axes—representing a device type, an operating system, and/or a device location—for a device feature. The computer system can therefore project the composite session container (e.g., a multi-dimensional vector) into the feature space based on values stored in the session container—corresponding to a URL feature, a visual media feature, and a device feature—and along the first, second, and third set of axes accordingly.

The computer system can therefore represent and/or project this user within the feature space based on feature data (e.g., URL data, webpage data, device data, slot data, visual media data, user data) collected for this user across one or more browse sessions, across one or more webpages accessed by the user (e.g., via the user computing device), and/or across one or more visual media (e.g., presented within slots loaded on webpages) presented to the user.

Furthermore, the computer system can repeat this process for each other user, in the population of users, to represent each other user within the feature space and therefore generate a graphical representation of all behaviors of these users during a particular sampling period.

In one example, the computer system can populate the feature space with a first vertex defined by a first set of coordinates representing: a first address (e.g., a URL, a domain, a pointer) associated with a first webpage accessed by a first computing device associated with a first user; a second address associated with a second webpage accessed by the first computing device; a first set of device characteristics of the first computing device; a first visual media presented to the first user within a first slot loaded on the first webpage; a second visual media presented to the first user within a second slot loaded on the second webpage; a first set of engagement data (e.g., clicks, scrolls, views) representing interactions of the first user with the first visual media; and/or a second set of engagement data (e.g., clicks, scrolls, views) representing interactions of the second user with the second visual media.

The computer system can then repeat this process for each user, in the population of users, to populate the feature space with a population of vertices distributed about the feature space, such that users exhibiting similar behaviors—such as visiting the same webpages or URLs, viewing the same visual media, accessing webpages via devices exhibiting similar characteristics, etc.—are represented by vertices exhibiting relatively high proximity within the feature space while users exhibiting dissimilar behaviors are represented by vertices exhibiting relatively low proximity within the feature space.

5.1 Feature Space: Environment+User

Furthermore, in one implementation, the computer system: maps a population of users to a population of URLs visited and/or frequented by one or more users in the population of users; predicts characteristics of users in the test population based on characteristics of URLs (e.g., content type, category) visited by these users; interprets similarities and/or differences between users in the test population and URLs in the population of URLs; and leverages these similarities and/or differences to selectively target a subset of URLs (or users that visit this subset of URLs) and/or new URLs (e.g., outside the population of URLs) similar to this subset.

In particular, in this implementation, the computer system can identify a target population of users exhibiting a primary target feature—such as a target demographic (e.g., age, gender, income, interests) and/or a target behavior or "outcome" (e.g., conversion, click, view) when served a particular visual media in a campaign—predicted to correlate to a target outcome (e.g., a target conversion rate, a target click-through rate, a target viewability, a target video completion) defined by the campaign. Then, for each user in the target population, the computer system can: access a set of browsing data—representing a set of URLs, in a population of URLs, previously visited by the user (e.g., during a test period)—stored for the user; and represent the set of browsing data in a user feature container (e.g., a vector, a matrix) associated with the user to generate a population of user feature containers associated with the target population, as described above. For example, the computer system can: represent characteristics of a first URL, in the set of URLs, as a first set of numerical values in a first set of slots of the user feature container; represent characteristics of a second URL, in the set of URLs, as a second set of numerical values in a second set of slots of the user feature container; etc.

Then, for each URL, in the population of URLs, the computer system can: retrieve a set of environment data associated with the URL and representing characteristics of the URL, such as including a content category (e.g., sports, travel, leisure, home improvement, health) associated with the URL, a domain of the URL, characteristics of users that visit and/or frequent the URL, etc.; and represent the set of environment data in a URL feature container to generate a population of URL feature containers associated with the population of URLs. For example, the computer system can: represent characteristics of the first URL as a first set of values in a first set of slots of a first URL feature container; represent characteristics of the second URL as a second set of values in a second set of slots of a second URL feature container; etc.

The computer system can then project the population of URL feature containers into a multi-dimensional feature space based on numerical values (e.g., vector coordinates) stored in each URL feature container, such that URLs defining similar characteristics (e.g., content category, domain, size, visitors) exhibit relatively high proximity within the multi-dimensional feature space and URLs defining dissimilar characteristics exhibit relatively low proximity within the multi-dimensional feature space. Then, within the same multi-dimensional feature space, the computer system can project the population of user feature containers into the multi-dimensional feature space based on numerical values (e.g., vector coordinates) stored in each user feature container, such that: users defining similar browsing histories—and/or other user features (e.g., demographic, device type, location)—exhibit relatively high proximity within the multi-dimensional feature space; users defining dissimilar browsing histories exhibit relatively low proximity within the multi-dimensional feature space; and, each user, in the target population, exhibits relatively high proximity to each URL, in the population of URLs, visited by this particular user and represented in the set of browsing data associated with this particular user.

Therefore, within this multi-dimensional feature space, the computer system can generate a graphical representation (or "map") of each user's browsing history that defines a population of subregions (e.g., point clouds) containing groups or "clusters" of relatively similar users and URLs predicted to yield similar outcomes when served a particular visual media in a campaign. In particular, by representing users and URLs in a singular multi-dimensional feature space, the computer system can draw direct comparisons between different URLs (e.g., a first URL and a second URL), different users (a first user and a second user), and/or URLs and users (e.g., a first URL and a first user), such as based on locations of these users and URLs within the feature space.

In one example, the computer system can: locate a first URL—represented in a first URL container defining a first location within the feature space—and a first user represented in a first user container defining a second location within the feature space; estimate a distance (e.g., a Euclidean distance, a dot product, a cosine distance) between the first location and the second location within the feature space; and, based on the distance, characterize a similarity between the first URL and the first user, such as a relatively high similarity in response to the distance falling below a threshold distance or a relatively low similarity in response to the distance exceeding the threshold distance. In this example, in response to the distance falling within the threshold distance, the computer system can selectively target slots loaded on webpages linked to the first URL—such as accessed by a known or unknown user—with visual media content that the first user previously engaged with according to a target outcome of the campaign, and thereby serve this visual media to users who may exhibit similar behaviors as the first user based on visiting webpages linked to the first URL. Furthermore, the computer system can identify a set of URLs falling within the threshold distance of the first URL and selectively target slots loaded on webpages associated with the set of URLs.

6. Outcome Prediction: Environment-Specific

The computer system can match environments—such as a particular webpage at a particular URL, a particular slot within the particular webpage, and/or a particular computing device accessing the particular webpage—to current or future visual media and/or campaigns based on predicted user interactions with visual media in these campaigns and target outcomes (i.e., types and/or degrees of user interactions) defined for these campaigns. In particular, the computer system can leverage characteristics of a set of features defined for the environment—such as characteristics of a URL, a webpage, a slot loaded on a webpage and configured to receive visual media content, a user computing device, etc.—to selectively serve and/or withhold serving of visual media to this environment for a particular campaign.

In one implementation, the computer system can: access a set of features defined for a particular media environment, such as a particular webpage, a particular slot loaded on a webpage, a particular slot accessed by a particular computing device; generate a feature container associated with this particular media environment; access a target feature container defining a target set of features (e.g., a particular combination of features) associated with a target outcome of a campaign; characterize a difference between the feature container and the target feature container; and, based on the difference, selectively serve or withhold serving visual media to this particular media environment, a particular user, electronic document (e.g., webpage, native application), or slot (e.g., loaded within an electronic document).

For example, the computer system can: populate a feature space with a first vertex defined by a first set of coordinates representing a first set of features of a first slot rendered within a first webpage accessed by a first computing device; locate a target vertex defined by a target set of coordinates representing a first set of target features defined for a campaign; and estimate a first distance between the first vertex and the target vertex based on the first set of coordinates and the target set of coordinates. For example, the computer system can calculate a dot product, a Euclidean distance, a cosine distance, etc. between the first vertex and the target vertex. Then, the computer system can select the first visual media for presentation within the first slot in response to the first distance falling below a threshold distance. Alternatively, in response to the first distance exceeding the threshold distance, the computer system can reject the first visual media for serving to the first slot.

7. Outcome Model

The computer system can also implement an outcome model configured to output a prediction of a user's propensity to engage (e.g., interact) with visual media according to a target outcome (e.g., defined by the visual media), when served this visual media (e.g., a prediction of the user's "intent" to interact with the visual media, a prediction of the user's propensity to interact with the visual media according to the particular target outcome), such as in a particular slot. In particular, the computer system can access an outcome model configured to calculate an outcome score representative of a probability that a user will interact with visual media, loaded in a particular slot, to achieve a particular target outcome based on characteristics of the particular slot (e.g., URL, webpage metadata, time, geographic location, placement of slot on webpage).

The computer system can leverage this outcome model to: predict attention metrics (e.g., number of scrolls, number of horizontal swipes, whether a user will click on a visual media, number of gestures performed by a user while a visual media is in a viewport of a computing device of the user, etc.) based on slot characteristics. For example, the computer system can implement the outcome model to calculate probabilities of achieving target outcomes (e.g., VCR, CTR, viewability) based on characteristics (i.e., slot characteristics) of queries for visual media received.

For example, as described in U.S. patent application Ser. No. 17/190,133, filed on 2 Mar. 2021—which is incorporated in its entirety by this reference—the computer system can store a "VCR" model configured to: intake visual media metadata (e.g., visual media, visual media format, type of brand advertised, type of product advertised, etc.) given a particular video visual media; and output an outcome score and/or probability that the user will view a minimum proportion of the particular video visual media in the slot based on visual media metadata and the set of slot characteristics. Similarly, the VCR model can also: intake a set of slot characteristics (e.g., time, geographic location, URL) for a slot located on a webpage accessed by a computing device of a user; and output a probability that the user will view a minimum proportion (e.g., 50%, 70%, 90%) of a video visual media served in this slot based on this set of slot characteristics.

The computer system can similarly implement other outcome models, such as: a viewability model configured to output a probability that a minimum proportion of pixels of visual media within the slot will be displayed in a viewport of the computing device of the user; a click-through model configured to output a probability that the user will click on visual media in the slot; a click-through conversion model configured to output a probability that the user will click on visual media and complete a purchase of a product advertised; etc. The computer system can also implement outcome models configured to predict probabilities of particular user interaction types, such as: a scroll model configured to output a probability that the user will scroll back and forth over visual media at least a minimum number of times; a gesture model configured to output a probability that the user will perform a gesture (e.g., tilt) with her mobile device to interact with visual media; a touch model configured to output a probability that the user will touch visual media in a viewport of the user's mobile device a minimum number of times; etc.

Therefore, the computer system can leverage an outcome model: to predict attention metrics for a user interacting with visual media in a particular slot—such as number of scrolls, number of horizontal swipes, whether a user will click on a visual media, number of gestures performed by a user while a visual media is in a viewport of a computing device of the user, etc.); and to calculate an outcome score for the user interacting with visual media in this particular slot based on these attention metrics. Thus, the computer system can leverage the outcome model to predict types and/or magnitudes of user interactions with visual media loaded into a particular slot defining a set of slot characteristics (e.g., URL, location of the slot within the webpage, webpage metadata, time of day, device characteristics) for this particular slot.

Further, the computer system can similarly leverage an outcome model to predict types and/or magnitudes of user interactions with visual media loaded in a particular slot, defining a set of slot characteristics, given a particular content feature, such as: a particular visual media, a particular campaign, a particular visual media format, a particular visual media creative, and/or any combination of these content features. For example, the computer system can implement an outcome model configured to intake: slot characteristics (e.g., URL, webpage metadata, location of slot within webpage, time of day, geographic location of computing device); webpage data or characteristics (e.g., webpage metadata, historical engagement data for visual media loaded on a particular webpage); visual media data or characteristics (e.g., visual media metadata, format, historical engagement data for a particular visual media); visual media format data or characteristics (e.g., type of format, format metadata, historical engagement data for a particular visual media format); and/or any combination of these data and/or characteristics. The computer system can then leverage the outcome model to output an outcome score or set of outcome scores (e.g., for a set of target outcomes) given these data and/or characteristics.

In one variation, the computer system can store a set of outcome models associated with different target outcomes. In particular, the computer system can: implement the foregoing methods and techniques to predict an outcome score for each target outcome by injecting a set of slot characteristics, received for a particular slot, into each of these outcome models; and then output an outcome score and/or probability that the user will achieve each target outcome when served visual media in this slot. The computer system can also calculate outcome scores across these set of target outcomes for a particular visual media by injecting a set of slot characteristics, received for a particular slot, and characteristics of a particular visual media (e.g., visual media metadata, subject, format, historical engagement data) into each of these outcome models; and then output an outcome score and/or probability that the user will achieve each target outcome when served this particular visual media in this particular slot.

Alternatively, the remote computer system can implement a single outcome model that outputs an outcome score representative of a user's predicted degree of engagement with visual media in a particular slot on a webpage accessed by the user according to a set of attention metrics (e.g., scrolling back and forth over a visual media at least a minimum number of times, clicking on an visual media, swiping laterally through content with an visual media, viewing at least a minimum duration of a video with an visual media, converting through an visual media, exhibiting at least a threshold increase in brand recognition after a visual media is served to the user, etc.).

7.1 Outcome Scores

In one implementation, the remote computer system can calculate outcome scores for a particular target outcome, representing a degree of user engagement with visual media at a particular slot according to a particular outcome. For example, the remote computer system can calculate a VCR score representing a user's propensity to watch video visual media at a particular slot defining a set of slot characteristics (e.g., URL, webpage metadata, slot location on webpage, time of day, geographic location of device). In another example, the remote computer system can calculate a viewability score representing a user's propensity to view at least a minimum proportion of visual media in a slot for at least a minimum duration. In yet another example, the remote computer system can calculate a scroll score representing a user's propensity to scroll back and forth over visual media in a slot at least a minimum number of times.

In one variation, the remote computer system can calculate outcome scores (e.g., viewability score) as a function of attention metrics (e.g., number of scrolls, duration a minimum proportion of pixels of visual media was visible in a viewport of a computing device of a user; number of interactions between the user and visual media). In this variation, the remote computer system can input slot characteristics into the outcome model to: predict a set of attention metrics given these slot characteristics; and calculate a set of outcome scores as a function of these attention metrics (e.g., a single attention metric, a combination of attention metrics, all attention metrics), each outcome score corresponding to a particular target outcome.

In one variation, the remote computer system can calculate a set of outcome scores given a particular visual media. For example, in response to receiving a query for visual media in a first slot, the remote computer system can: access a set of slot characteristics for the first slot associated with the query; access a set of visual media metadata for the first visual media; access an outcome model linking slot characteristics and visual media metadata to a set of target outcomes; and calculate a set of outcome scores for the first visual media at the first slot, each outcome score corresponding to a particular target outcome and representative of a user's propensity to engage with the first visual media in the first slot according to the particular target outcome. Additionally and/or alternatively, the remote computer system can calculate a composite outcome score representative of the user's propensity to engage with the first visual media in the first slot according to all target outcomes.

The remote computer system can similarly calculate outcome scores for other creative variables, such as: campaigns; media formats; creative; etc. Additionally, the remote computer system can calculate outcome scores for any combination of these creative variables.

In one variation, the remote computer system can leverage slot characteristics (e.g., time of day, location of slot on the webpage, webpage characteristics, device characteristics) to calculate outcome scores for a particular media format, representing a degree of user engagement with visual media in the particular media format loaded at a particular slot. The remote computer system can then identify a particular media format best matched to a particular slot. For example, in response to receiving identification of a first slot loaded within a first webpage, the remote computer system can: extract a set of slot characteristics associated with the first slot; access an outcome model associating slot characteristics and user interactions with visual media rendered within slots; and calculate a first set of outcome scores for a particular media format (e.g., static, video, interactive, banner), each outcome score corresponding to a target outcome and representative of a user's propensity to engage with the visual media of the particular media format, presented within the first slot, according to the target outcome. More specifically, in this example, the remote computer system can: calculate a first outcome score for a first media format responsive to scroll inputs by the user, the first outcome score corresponding to a first target outcome (e.g., viewability); and calculate a second outcome score for the first media format, the second outcome score corresponding to a second target outcome (e.g., conversion). In response to the first outcome score exceeding the second outcome score, the remote computer system can assign the first target outcome to the first slot for visual media of the first media format. In this example, the remote computer system can then select an visual media, of the first media format, in a campaign specifying the first target outcome, for presentation within the first slot.

Additionally, in the preceding example, the remote computer system can calculate a second set of outcome scores associated with a second media format defining a set of selectable regions. The remote computer system can then select a particular media format (e.g., the first or the second media format) most likely to achieve each target outcome, in the set of target outcomes. For example, the remote computer system can: select the first media format responsive to scroll inputs for visual media specifying a target outcome of viewability; and select the second media format defining the set of selectable regions for visual media specifying a target outcome of conversion.

In another example, the remote computer system can calculate a composite outcome score for a particular media format. In particular, in response to receiving identification of a first slot loaded within a first webpage, the remote computer system can: extract a set of slot characteristics associated with the first slot; access the outcome model associating slot characteristics and user interactions with visual media rendered within slots; and calculate a first set of outcome scores for the particular media format. The remote computer system can then calculate a composite outcome score for the particular media format based on each outcome score, in the first set of outcome scores. Then, in response to the composite outcome score exceeding a threshold outcome score, the remote computer system can select the first media format for visual media presented within the first slot. The remote computer system can repeat this process for each media format, in a set of media formats, to calculate a set of composite outcome scores. The remote computer system can therefore: identify a subset of composite outcome scores, in the set of composite outcome scores, exceeding the threshold outcome score; and select a subset of media formats, in the set of media formats, and corresponding to the subset of composite outcome scores, for visual media presented within the first slot. Alternatively, the remote computer system can: rank the set of composite outcome scores to identify a particular composite outcome score exceeding each other composite outcome score, in the set of composite outcome scores; and select a particular media format corresponding to the particular composite outcome score for visual media presented within the first slot.

7.1.1 Training the Outcome Model

In one variation, the computer system automatically develops (or "learns") an outcome model for a particular target outcome based on visual media characteristics, engagement data, and outcomes recorded at slots containing visual media served to a subset of users in a user population during a training period.

For example, during a training period, the computer system can: serve visual media to slots loaded on webpages accessed by computing devices of users in a subset of users in a user population; access slot characteristics (e.g., URL, website and/or native application, time of day, geographic location, device, visual media metadata) for each slot; record attention metrics (or user interactions) (e.g., number of scrolls back on forth over a visual media, duration a minimum proportion of a visual media was visible in a viewport of the computing device, location of a visual media within a viewport of the computing device, number of horizontal swipes across a visual media) with visual media contained in these slots; access a set of outcomes associated with these user interactions (e.g., conversion, click-through, brand lift, viewability, VCR); deduce a particular user interaction type or combination of user interaction types that anticipates a particular outcome; and, deduce slot characteristics (or "query characteristics") that anticipate these particular user interaction types or combinations of user interaction types. Given this data, the computer system can calculate and assign outcome scores to each slot served visual media during the training period.

Later, during a live period succeeding the training period, in response to receiving a query for a visual media from a particular slot (e.g., located within a native application accessed by a computing device associated with a user), the computer system can: access a set of slot characteristics (e.g., URL, native application metadata, time, geographic location of device) for the particular slot; access the outcome model linking slot characteristics to target outcomes of campaigns; input this set of slot characteristics into the outcome model to estimate a set of attention metrics (e.g., number of scrolls, percentage of visual media pixels visible in a viewport of the computing device, duration of time a minimum number of pixels are visible in the viewport, etc.) representing predicted interactions between this user and visual media at this particular slot; and, given a particular target outcome, output an outcome score for this particular target outcome for the user interacting with visual media in the particular slot, based on the slot characteristics and these predicted interactions. Therefore, the computer system can leverage attention metrics and slot characteristics recorded during the training period, to generate a model configured to predict attention metrics given slot characteristics during the live period (e.g., based on similarities and/or dissimilarities of slot characteristics). The computer system can then calculate outcome scores based on these predicted attention metrics to intelligently identify and/or serve visual media to users that these users are more likely to engage with according to these attention metrics.

The computer system can implement similar methods and techniques to develop an outcome model for a particular visual media, for a particular campaign, for a particular visual media format, for a particular webpage (e.g., URL), for a particular slot on a webpage, for a particular slot location on a webpage, for particular visual media, etc. Similarly, the computer system can then leverage this outcome model to intelligently identify, suggest, and/or select visual media, campaigns, slots, etc. most likely to achieve a high degree of user engagement according to a particular target outcome (e.g., VCR, viewability, click-through). Alternatively, the computer system can implement a generic outcome model to predict user interactions with visual media loaded in a particular slot, such as regardless of the visual media, visual media format, campaign, etc.

In one implementation, the computer system can generate a visual media-specific outcome model configured to intake a set of slot characteristics and to output an outcome score for a user interacting with a particular visual media loaded in a particular slot. For example, during a training period for a first visual media (e.g., prior to a live period for the first visual media), the computer system can: serve the first visual media to slots loaded on webpages accessed by computing devices of users in a subset of users in a user population; access a corpus of slot characteristics (e.g., URL, website and/or native application, time of day, geographic location, device, visual media metadata) for each slot loaded with the first visual media; and access a corpus of engagement data, corresponding to the first visual media loaded within these slots, including attention metrics (or user interactions) (e.g., number of scrolls back on forth over a visual media, duration a minimum proportion of a visual media was visible in a viewport of the computing device, location of a visual media within a viewport of the computing device, number of horizontal swipes across a visual media) and/or outcomes associated with these user interactions (e.g., conversion, click-through, brand lift, viewability, VCR). The computer system can then implement statistical analysis, regression, and/or artificial intelligence, etc. to: derive typical slot characteristics that anticipate a target outcome (e.g., minimum viewability, minimum VCR) and/or target set of interactions (e.g., minimum number of scrolls, minimum number of clicks) defined by the first visual media; and compile these slot characteristics into a visual media-specific outcome model for the first visual media.

Alternatively, in another implementation, the computer system can leverage a generic outcome model to initially select and serve visual media for presentation within slots and customize this outcome model over time. For example, the computer system can initially leverage a generic outcome model to select a first visual media for presentation within a first slot, based on a first set of slot characteristics corresponding to the first slot. The computer system can then access a set of engagement data, for a user interacting with the first visual media in the first slot, including attention metrics (or user interactions) and/or outcomes associated with these user interactions. The computer system can then leverage these engagement data and slot characteristics to modify the generic outcome model. By repeating this process for each instance of the first visual media served to a slot, the computer system can modify, mask, or customize the generic outcome model for the first visual media.

The computer system can similarly implement these methods and techniques, described above, to generate an outcome model for a particular campaign, a particular webpage, a particular visual media format, or for any other content feature.

In one variation (as described in U.S. patent application Ser. No. 16/119,819), the computer system can define a threshold outcome score (e.g., minimum video completion rate, minimum viewability, minimum number of scrolls, minimum number of clicks) that indicates at least a minimum engagement with visual media (e.g., a minimum probability of a target outcome). For example, during a test period, the computer system can serve visual media, loaded in slots, to a population of computing devices accessed by a population of users. For each slot served to the population of computing devices, the computer system can record: a set of slot characteristics (e.g., URL, webpage data, time of day, type of user device, location of slot within webpage); and a set of engagement data (i.e., attention metrics) (e.g., clicks, scrolls, swipes, tilts, view duration, percent video completion, cumulative pixel exposure) representing user interactions with visual media. The computer system can then: access outcomes—of a particular outcome type (e.g., brand lift, conversion, VCR, viewability)—of consumption of visual media presented within slots to the population of computing devices during the test period; calculate a correlation (e.g., covariance) between engagement data and outcome of the particular outcome type based on engagement data and outcomes associated with each set of engagement data; and define a type and/or magnitude of user interactions associated with a threshold probability of an outcome of the particular outcome type based on this correlation. More specifically, in this example, the computer system can implement machine learning, artificial intelligence, a neural network, or other analysis techniques to calculate a probability of an outcome of the particular type as a function of engagement data (i.e., attention metrics) based on recorded engagement and outcome data for the population of users. Based on a target probability of a target outcome occurring as a result of viewing visual media (e.g., 50% probability of the target outcome)—such as specified for by a campaign, by a visual media publisher or brand—the computer system can estimate a target set of interactions (i.e., attention metrics) (e.g., magnitude and/or type) predicted to yield this target probability of the target outcome. Further, the computer system can implement the methods described above to generate a model linking slot characteristics of slots accessed by the population of computing device to user interactions with visual media loaded in these slots and/or to outcomes associated with these user interactions.

7.1.2 Feature Space+Outcome Model

In one implementation, the computer system can train an outcome model configured to predict a likelihood of achieving a target outcome (e.g., defined by a campaign) when serving visual media to a particular environment (e.g., webpage, slot, computing device) based on a location of a session container—representative of a set of features characterized for the particular environment—within the feature space.

In particular, the computer system can serve visual media in slots inserted into a population of electronic documents accessed by computing devices associated with a population of users, such as during an initial time training period. Then, for each instance of a visual media served to a slot, loaded within an electronic document, in the population of electronic documents—and accessed by a computing device of a user, in the population of users—the computer system can: characterize a set of features, representative of the instance of the visual media served to the slot, including a set of user characteristics corresponding to the user, a set of device characteristics corresponding to the computing device, a set of webpage characteristics corresponding to the electronic document, a set of media characteristics corresponding to the visual media, and/or a set of engagement data representing user interactions with the visual media presented within the slot loaded within the electronic document; and represent the set of features and the set of engagement data in a feature container, in a population of feature containers, associated with the instance of the visual media served to the slot. The computer system can then compile the population of feature containers into an outcome model linking characteristics of the set of features slot characteristics to target outcomes of visual media consumption based on the population of feature containers.

In one example, the computer system can: flag a target set of users, in a population of users, previously served visual media within a campaign (e.g., during a particular sampling period); access a corpus of engagement data representing user interactions of users, in the target set of users, with visual media in the campaign; and, based on the corpus of engagement data, identify a first subset of users, in the target set of users, that achieved a target outcome (e.g., a conversion, a purchase, a click, a view) defined by the campaign when interacting with one or more visual media in the campaign. The computer system can also leverage the corpus of engagement data to identify a second subset of users, in the target set of users, that did not achieve the target outcome when interacting with visual media in the campaign.

Then, for a first user, in the population of users, the computer system can: access a first user session container—representing historical browsing data (e.g., a series of URLs), device data (e.g., device type, geographic location), and/or webpage and/or visual media metadata—generated for the first user; and project the first user session container, in a population of user session containers, into the feature space—populated with a population of URL feature containers representing URLs accessed by the population of users—based on numerical values (e.g., vector coordinates) stored in the first session container and corresponding to various axes defined by the feature space. The computer system can then: repeat this process for each other user, in the population of users, to generate a distribution of user feature containers and URL feature containers—each arranged at a location defined by a set of numerical values (e.g., vector coordinates) stored within the corresponding container and representing various features (e.g., URL, webpage domain, webpage metadata, visual media metadata, user device data)—arranged about the feature space.

The computer system can then: locate a first subset of user feature containers, in the population of user feature containers, corresponding to the first subset of users, in the target set of users; characterize a first set of locations within the feature space—each location represented by a set of numerical values (e.g., vector coordinates) extracted from axes of the feature space—corresponding to the subset of user feature containers; and, for each location, in the first set of locations, label the location with a first score (e.g., "1", "100%", "pass") representing achievement of the target outcome. The computer system can similarly: locate a second subset of user feature containers, in the population of user feature containers, corresponding to the second subset of users in the target set of users; characterize a second set of locations within the feature space corresponding to the second subset of user feature containers; and, for each location, in the second set of locations, label the location with a second score (e.g., "0", "0%", "fail") representing failure to achieve the target outcome.

For example, for a first location, in the first set of locations, the computer system can: extract a first set of coordinates defining the first location within the feature space; insert the first set of coordinates into a first set of slots of a feature container associated with the first location; and insert the first score in a first slot of the feature container to associate the first score with the first set of coordinates. The computer system can repeat this process for each other location, in the first set of locations, to generate a first set of feature containers representing combinations of features associated with a high correlation of achieving the target outcome of the campaign. Then, for a second location, in the second set of locations, the computer system can: extract a second set of coordinates defining the second location within the feature space; insert the second set of coordinates into a second set of slots of a feature container associated with the second location; and insert the second score in a second slot of the feature container to associate the second score with the second set of coordinates. The computer system can repeat this process for each other location, in the second set of locations, to generate a second set of feature containers representing combinations of features associated with a low correlation of achieving the target outcome of the campaign.

The computer system can then leverage the first and second set of feature containers to train an outcome model to predict an outcome score—representing a likelihood of user interactions with visual media corresponding to a target outcome defined by a campaign—given characteristics of a set of features that define a particular location within the feature space. In particular, the computer system can implement the outcome model to predict an outcome score for any entity—such as for a particular slot, webpage, URL, user device, visual media, campaign, and/or for any combination of these features—based on a location of a container (e.g., associated with the entity) within the feature space, such as relative a target container and/or target group of containers associated with high probability of achieving the target outcome.

8. Target Feature Selection

In one variation, the computer system can learn a target set of features associated with a high likelihood of achieving a target outcome for a particular campaign.

For example, for a first campaign defining a first target outcome (e.g., a target viewability), the computer system can identify a set of target features—including URL, device type (e.g., operating system, manufacturer, mobile or desktop), and device location—that individually and/or in combination exhibit a relatively high strength of correlation to the first target outcome. Therefore, the system can leverage identification of features, in the first set of target features, to predict outcomes of media consumption for the first campaign, such as at a confidence exceeding a threshold confidence. Additionally, for a second campaign defining a second target outcome (e.g., a target click-through rate), the computer system can identify a second set of target features—including webpage domain, webpage content category, media format, and time of day—that individually and/or in combination exhibit a relatively high strength of correlation to the second target outcome. Therefore, the system can leverage identification of features, in the second set of target features, to predict outcomes of media consumption for the second campaign, such as at a confidence exceeding the threshold confidence.

In one implementation, the computer system automatically learns a combination of features that exhibit a high strength of correlation to the target outcome for a campaign, such as during a first segment of a new campaign. In particular, in this implementation, the computer system can serve visual media in the new campaign to a population of computing devices. Then, for each instance of a visual media, in the new campaign, served to the population of computing devices, the computer system can: characterize a set of features (e.g., a URL, a set of webpage metadata, a set of media metadata, a user computing device) defined for an environment presenting the visual media; represent the set of features in a container, in a population of containers, associated with this instance of the visual media; access a set of engagement data, in a corpus of engagement data, collected by the visual media; based on the set of engagement data, characterize an outcome, in a set of outcomes, associated with serving this visual media to a particular computing device in the population of computing devices; access a target outcome defined for the new campaign; based on a difference between the outcome and target outcome, derive an outcome score, in a corpus of outcome scores, for the user interacting with the visual media; and represent the outcome score in the container.

Then, for each feature, in the set of features, the computer system can: derive a correlation between a set of values—representative of the feature—stored in the population of containers and the corpus of outcome scores; and, in response to the correlation exceeding a threshold correlation, insert the feature into a target set of features, in the set of features, defined for the first campaign. Alternatively, in response to the correlation falling below the threshold correlation, the computer system can discard the feature for this first campaign. The computer system can thus narrow the set of features down to a target set of features that exhibit a higher correlation to the target outcome.

Then, during a second time period succeeding the first time period, the computer system can predict outcomes of serving visual media in the new campaign based on the target set of features, rather than based on all features in the set of features. Therefore, by identifying these target features—predicted to more accurately predict user interactions with visual media—the computer system can reduce an amount of data required to accurately predict user interactions with visual media in this campaign, thereby: enabling faster transfer of data between a user computing device and the (remote) computer system and therefore reducing latency; reducing storage requirements by limiting an amount of data stored in these session containers; and reducing compute required for making predictions based on these features.

8.1 Prepopulated Targets for New Campaign

A new campaign can be loaded into the computer system or otherwise activated by a brand or creative and can include: a single visual media in a single visual media format, a single visual media in multiple formats, or multiple visual media in one or more formats, etc.; and a target outcome for users viewing visual media within this campaign. The computer system can then implement the outcome model for this target outcome and historical data for a population of users and/or environments (e.g., URL, webpage, slot) in order to rank these users and/or environments by predicted user intent to engage with a visual media in this campaign according to a target outcome specified by this new campaign.

In one implementation, the computer system can aggregate a population of users and/or environments (e.g., URLs, webpages) who may be candidates for serving a visual media in the new campaign, such as by user demographic (e.g., age, gender), location, content category, and/or other characteristics specified by the new campaign. The computer system can then derive intents of users and/or environments in this population to engage with the visual media in the campaign according to the specified target outcome based on historical engagement data and/or feature data collected through visual elements previously served to these users and/or environments. For example, for a single user, the computer system can: compile engagement data collected by visual elements served to this user over time into a series of session containers; and pass these session containers into the outcome model—corresponding to a target outcome specified by the new campaign—to calculate a probability that the user will engage with visual media in this campaign according to this target outcome. Similarly, for a single URL, the computer system can: compile engagement data collected by visual elements served to slots at this URL over time into a series of session containers; and pass these session containers into the outcome model—corresponding to a target outcome specified by the new campaign—to calculate a probability that users visiting this URL will engage with visual media in this campaign according to this target outcome.

In this example, the computer system can also access metadata for the new campaign or for a specific visual media in the new campaign, such as: the format of the visual media (e.g., whether the visual media is static, includes video content, or is interactive); content within the visual media (e.g., the type of product or brand represented in the visual media); a target location of the visual media presented on a webpage (e.g., at the top or bottom of the webpage); whether the campaign includes a series of visual medias designated for presentation in a particular order or a contiguous series; or time of day or time of year that the new campaign is scheduled to be live; etc. The computer system can then inject these metadata into the outcome model alongside engagement data for the user in order to predict the user's intent to engage with the visual media or campaign with greater accuracy and/or contextual understanding for how the visual media is served to users. The computer system can represent this predicted probability—that the user will engage with the visual media according to the target outcome—as a score (e.g., a "confidence score").

The computer system can repeat this process for other each other user and/or environment in the population to calculate a likelihood that each user and/or environment will achieve the target outcome specified by this new campaign—when presented visual media from this campaign—and represent these likelihoods as scores. The computer system can then rank users and/or environment by their scores and generate a list of users and/or environments most likely to engage with the visual media in the new campaign according to the target outcome based on these scores.

In one variation, the computer system can leverage the outcome model to identify a particular group of webpages for targeting with visual media in a new campaign. For example, during an initial time period, the computer system can: serve a set of visual media to slots loaded within a population of webpages accessed by a population of computing devices of a population of users; access a corpus of feature data representing characteristics of the population of webpages, the population of computing devices, the population of users, and the set of visual media; access a corpus of engagement data representing interactions of the population of users with visual media in the set of visual media; and derive an outcome model including correlations between user characteristics, characteristics of visual media, characteristics of webpages, and characteristics of user computing devices to the set of target outcomes based on the corpus of engagement data. Later, the computer system can: receive identification of a first visual media in a new campaign defining a first target outcome (e.g., viewability, click-through, video completion); for each webpage, in the population of webpages, calculate a probability of user engagement with the first visual media—presented within a slot on the webpage—corresponding to the first target outcome based on the corpus of feature data, the corpus of engagement data, and the outcome model; and flag a subset of webpages, in the population of webpages, associated with a greatest probability of engagement with the first visual media according to the first target outcome. Later, in response to receiving a request for visual media from a first computing device for a first slot loaded within a first webpage, in the subset of webpages, the computer system can automatically serve the first visual media com in the first campaign to the first slot.

Therefore, each time a computing device—accessing a webpage previously predicted to attract users that are more likely to engage with visual media in the new campaign according to the specified target outcome—requests visual media from the computer system, the computer system can automatically serve this visual media to the user's computing device or interface with an external content server to serve this visual media to the user. The computer system can thus leverage historical feature data and/or engagement data collected by visual elements containing visual media content previously served to users in this population and existing outcome models: to predict intent of these users to engage with visual media content; to predict intent of intent of users to engage with visual media content presented within particular webpages (or any other environment type); and to preemptively flag select users and/or environments to receive visual media—in a new campaign—in the future based on alignment between predicted intent and a target outcome specified by this new campaign.

9. Real-Time Visual Media Selection

In one implementation, the computer system can execute Blocks of the method S100 to select visual media for placement in slots in (near) real-time based on characteristics of these slots.

In particular, the computer system can match a slot—loaded in an electronic document (e.g., a webpage, a landing page within a native application) accessed by a computing device of a user—to a particular visual media or media campaign based on: characteristics of a set of features defined for the slot, such as including characteristics of the slot (e.g., a position within the webpage, a size, a webpage containing the slot), the electronic document (e.g., a URL, a domain, a heading, a category type), the computing device (e.g., mobile or desktop, an operating system, a manufacturer, a geographic location), and/or the user (e.g., age, gender, income level); and target outcomes (e.g., click-through, conversion, viewability, video completion, brand lift) specified for various active visual media or media campaigns.

For example, when a user opens a webpage loaded with an empty slot via her computing device, the computer system can: receive a query from this slot; access characteristics of a set of features—such as including a URL, the webpage, the computing device, a particular visual media and/or campaign, etc.—defined for the slot; represent each characteristic of each feature, in the set of features, within a session container associated with the slot; insert the session container into the outcome model to predict user interactions with visual media in this slot and calculate a set of outcome scores corresponding to target outcomes specified by visual media and/or campaigns; select a particular visual media from a particular campaign based on predicted user interactions and the set of outcome scores; and serve the particular visual media, to the empty slot, before the webpage is loaded and visible to the user.

9.1 Environmental Features+Feature Container

In one implementation, the computer system can selectively serve visual media to a slot inserted within an electronic document (e.g., a webpage, a landing page of a native application) based on characteristics of a set of environmental features—including slot, webpage, and/or user device features—defined for the slot and defined, target characteristics of these environmental features (e.g., stored in the outcome model) predicted to yield a particular target outcome defined by visual media and/or a campaign.

In one example, the computer system can: receive identification of a slot—remaining outside a viewing window of the computing device—loaded within an electronic document accessed by a computing device (e.g., accessed by a user); characterize a first set of features representative of the slot; represent the first set of features in a session container associated with the slot; retrieve a target feature container representing a target combination of features predicted to anticipate a target outcome, in a set of target outcomes, defined for a campaign; characterize a difference between the session container and the target feature container (e.g., as described above); and, based on the difference, selectively serve a first visual media in the campaign to the slot for presentation to the user. For example, the computer system can: serve the first visual media to the slot in response to the difference falling below a threshold difference; and withhold serving the first visual media to the slot in response to the difference exceeding the threshold difference.

9.2 Environment+User Engagement+Feature Container

In one variation, the computer system can match a slot—loaded on a webpage accessed by a computing device of a user—to a particular visual media or campaign based on: target outcomes specified for various active visual media or media campaigns; characteristics of a set of features—such as a URL associated with the webpage, the computing device, the slot, and/or the user—defined for the slot; and historical engagement data collected by visual media served to the user's computing device, such as within the past few seconds, minutes, hours, days, weeks, or years.

9.2.1 Multiple Empty Slots: Single Webpage

In one implementation, the computer system can leverage engagement data, collected by one visual media loaded in a slot on the webpage, to select another visual media, specifying a target outcome (e.g., goal) matched to a likely behavior of the user, for insertion into another slot loaded on the webpage.

For example, a user may visit a webpage containing multiple slots, such as a first slot proximal the top of the webpage, a second slot proximal a middle of the webpage, and a third slot proximal the bottom of the webpage. Upon receipt of a request (i.e., query) for visual media for insertion into these slots, the computer system (functioning as a content server) can: then implement a generic content selector to select a first visual media for a first campaign (e.g., a "default" ad), such as based on a URL associated with the webpage, a geographic location of the user's computing device, content on the webpage, known attributes of the host website, and/or other limited available user or webpage metadata; and serve this first visual media—packaged in a first visual element—to the user's computing device for insertion into the first slot on the webpage. The computer system can also serve empty slots—defining visual media placeholders—to the computing device for insertion into the second and third slots on the webpage.

For example, the computer system can: access a set of slot characteristics defined for the first slot proximal the top of the webpage; represent the set of slot characteristics in a session container (e.g., a vector, a matrix)—as a first set of numerical values (e.g., in a first set of vector positions or slots)—associated with the first slot; and pass the first feature container into an outcome model to derive a first set of outcome scores for the first slot, each outcome score corresponding to a particular target outcome (e.g., VCR, viewability, brand lift, conversion, quantity of scrolls, quantity of clicks), in a set of target outcomes of visual media. Based on the set of outcome scores, the computer system can select a first visual media, from a first campaign specifying a first target outcome, in the set of target outcomes, for presentation within the first slot, as described above. The computer system can then serve this first visual media to the user's computing device for presentation within the first slot, such as prior to the webpage finishing loading on the user's computing device.

Once the first visual media is loaded within the first slot, the first slot can collect and return engagement data to the computer system, such as in real-time at a rate of 5 Hz. The computer system can then: represent these engagement data in the session container (as described in U.S. patent application Ser. No. 16/427,303) as a second set of numerical values (e.g., in a second set of vector positions or slots); access a second set of slot characteristics for the second slot proximal the middle of the webpage; represent the second set of slot characteristics—as a third set of numerical values (e.g., within a third set of vector positions or slots)—within the session container; and pass the (updated) session container—representing the first set of slot characteristics associated with the first set of engagement data and the second set of slot characteristics—into the outcome model to calculate a second set of outcome scores for the second slot. The computer system can then: identify a particular visual media—in a set of visual media in a set of campaigns that are currently active—associated with a particular target outcome that matches the most likely set of interactions of the user with visual media in the second slot; and serve this particular visual media to the user's computing device for immediate insertion into the second slot on the webpage prior to event that locates the second slot within a viewing window of the user's computing device, such as before the user scrolls down to the second visual media.

In this example, the computer system can repeat the foregoing process: to select a third visual media associated with a particular target outcome matched to a most-likely set of interactions of the user engaging visual media in the third slot, such as based on engagement data collected by both the first and second visual media; and to return this third visual media to the user's computing device in near real-time and before the user scrolls down to the third slot, now containing this third visual media.

9.2.2 Default Visual Media and Intra-Webpage Visual Media Exchange

In a similar implementation, when the user visits a webpage containing a slot on her computing device and the computer system receives a request for a visual media to render in this slot, the computer system can: implement a visual media selector to select a first or "default" visual media based on limited user data and/or device, slot, and/or webpage data, such as described above; and then serve a visual element containing this default visual media to the user's computing device. As the visual element—containing the default visual media—collects and returns engagement data to the computer system in real-time, the computer system can: represent these engagement data—in combination with characteristics of a set of features (e.g., URL, webpage, user device, visual media) of the slot—in a session container, such as a set of numerical values defining a multi-dimensional vector; pass this session container into an outcome model to estimate a predicted set of interactions between the user and the visual media, as described above. If the outcome model outputs a probability or a confidence score—for a particular set of interactions—that exceeds a threshold confidence (e.g., 80%), the computer system can then implement methods and techniques described above to select a second visual media specifying a target set of interactions matched to this predicted intent of the user and then return this second visual media to the user's computing device for insertion into the slot in replacement of the default visual media, all prior to the user scrolling down the webpage to the slot. The computer system can then render this second visual media within the slot rather than the default visual media, which may be more likely to achieve a target outcome, for this specific user, better matched to the target outcome of the second visual media than the default visual media.

Therefore, by loading a default visual media into a slot within the webpage, the computer system can guarantee that a visual media is available for presentation to a user within a slot on the webpage. The computer system can then selectively replace this default visual media with a second visual media specifying a target outcome better aligned to a likely intent or set of interactions of the user—as predicted by engagement data collected by the visual media during initial interactions of the user within the webpage—thereby increasing the value of served visual media for brands and increasing relevance of these visual media for the user.

9.2.3 Multiple Empty Slots: Multiple Webpages

In another implementation, the computer system can leverage engagement data collected by one visual media loaded onto a webpage accessed by a user during a browse session, to select a visual media, specifying a target outcome matched to a likely behavior of the user, for serving to the user during this browse session, such as accessed by the user at a different webpage.

For example, the computer system can: receive identification of a first slot loaded on a first webpage accessed at a computing device by a user; access a first set of slot characteristics for the first slot; input the first set of slot characteristics into an outcome model to calculate a first set of outcome scores for the first slot; and select a first visual media for insertion into the first slot based on the first set of outcome scores, as described above. Once the first visual media is loaded into the first slot, the computer system can receive engagement data recorded at the first slot, such as at a rate of 5 Hz, while the user navigates through the first webpage. The computer system can then compile these engagement data—in combination with the first set of slot characteristics—into a session container representing a current browse session for this user.

Then, when the user navigates to a next webpage within her web browser and the computer system receives a request (i.e., query) for a second visual media for insertion into a second slot loaded in the second webpage, the computer system can: receive a second set of slot characteristics for the second slot; represent the second set of slot characteristics in the session container; input the session container into the outcome model to calculate a set of outcome scores for the user for this second slot, each outcome score representing a prediction of the user's intent to interact with visual media (e.g., click on a visual media, swipe a visual media, view a video visual media for a minimum duration) according to a target outcome, in the set of target outcomes.

Once the computer system thus predicts the user's intent (e.g., represented by the set of outcome scores), the computer system can: identify a current campaign specifying a target outcome best matched (or suitably matched) to the user's intent (e.g., based on the set of outcome scores); and select a particular visual media within this campaign for the user. The computer system (or a content server, etc.) can then serve the particular visual media to the user's computing device for insertion in the second slot. The user may thus be relatively highly likely to interact with the particular visual media according to the target outcome.

9.2.4 Weighted Features

In this variation, the computer system can leverage recorded engagement data for a user interacting with visual media in one slot to predict this user's interactions with visual media served in other slots (e.g., during one browse session for this user). However, this limited volume of engagement data for the user may enable the computer system to predict the user's interactions with visual media loaded in slots with limited confidence and/or limited accuracy. Therefore, the computer system can leverage both slot characteristics (e.g., URL, location of slot in webpage, webpage metadata, time of day, type of device, location of device) and engagement data (e.g., from this browse session) to calculate outcome scores for a particular slot.

For example, for a particular slot, the computer system can: assign a high weight to limited existing engagement data of the user (e.g., stored in a session container for this browse session); assign a lower weight to historical engagement data associated with a set of slot characteristics (e.g., historical engagement data associated with the set of slot characteristics) for this particular slot; combine these data into a composite body of engagement data; and then pass this composite body of engagement data into an outcome model to calculate a set of outcome scores for this particular slot, each outcome score representing the user's current intent to interact with visual media in this slot according to a particular target outcome, in a set of target outcomes. The computer system can then implement methods and techniques described above to select a particular visual media best matched to this particular slot, based on the user's current predicted intent and historical engagement data of other users accessing slots similar to the particular slot accessed by the user.

The computer system can similarly leverage user engagement data to calculate outcome scores for other content features for a particular slot, such as: visual media; campaigns; visual media formats; visual media creative; etc. Additionally, the computer system can calculate outcome scores for any combination of these content features.

10. Updating the Outcome Model

In one implementation, the computer system can update the outcome model over time based on new engagement data and/or feature data collected during a live campaign. In particular, in this implementation, the computer system can leverage a difference between a predicted outcome score and an actual outcome score—calculated based on engagement data collected responsive to serving visual media to a user (e.g., within a particular webpage and/or slot)—to rectify the outcome model.

For example, the computer system can: receive identification of a slot loaded in a webpage accessed by a computing device of a user; for each feature, in a set of target features, defined for a campaign, extract characteristics, in a set of characteristics, representative of the feature; represent the set of characteristics in a container (e.g., a vector, a matrix) associated with the slot; access an outcome model linking characteristics of the set of target features to a target outcome defined by the campaign; predict an outcome score for the user interacting with a first visual media in the first campaign based on the outcome model and the container; and, in response to the outcome score exceeding a threshold score, serve the first visual media to the slot for presentation to the user.

Then, in response to serving the first visual media to the slot, the computer system can: access a set of engagement data—representing user interactions with the first visual media presented within the slot—recorded at the slot; calculate an actual outcome score based on the set of engagement data; and rectify the outcome model accordingly. For example, the computer system can: represent the outcome score (e.g., a predicted outcome score) in the container; and represent the actual outcome score in the container, thereby associating the actual outcome score with characteristics of the set of target features and the (predicted) outcome score; and feed the container to the outcome model to retrain the outcome model—based on a difference between the outcome score and the actual outcome score—accordingly.

11. Publisher Tool

In one implementation, the computer system can execute Blocks of the method S100 to assist publishers (e.g., visual media publishers) in selecting visual media (e.g., visual media, campaigns, visual media formats, etc.) to serve to users at particular slots on webpages accessed by these users in order to achieve high user engagement according to particular target outcomes and thus increase revenue. However, the computer system can similarly execute Blocks of the method S100 to assist a brand, a campaign, or any other entity in targeting visual media toward impressions that are more likely to achieve a particular target outcome.

For example, a publisher may currently have an inventory of 100 active campaigns, each campaign defining ten unique visual media. In response to receiving a query for a visual media from a particular slot, the computer system can implement Blocks of the method S100 to select a single campaign out of the 100 active campaigns most likely to achieve high user engagement according to a target outcome specified by the campaign, and to select a single visual media from the campaign most likely to achieve high user engagement according to this target outcome.

In this implementation, the computer system can leverage slot characteristics to identify a particular target outcome (e.g., VCR, viewability, brand lift) that a user interacting with visual media in a particular slot is most likely to achieve. For example, in response to receiving identification of a first slot loaded within a first webpage accessed by a computing device associated with a user, the computer system can: receive a first set of slot characteristics (e.g., URL, location of the slot within the webpage, dimensions of the slot, time of day accessed by the computing device, geographic location of the computing device, type of computing device); access a catalog of visual media assigned to a set of webpages including the first webpage, each visual media in the catalog of visual media defining a target outcome representative of a set of target interactions for users interacting with the visual media; and access a model associating slot characteristics and a set of target outcomes of visual media in the catalog of visual media.

Then, for each target outcome, in the set of target outcomes, the computer system can: estimate an outcome score for the first slot based on the first set of slot characteristics and the outcome model, the outcome score representative of a probability of the user interacting with visual media, presented within the first slot, according to the target outcome. In particular, in this example, the computer system can: estimate a first outcome score corresponding to VCR; estimate a second outcome score corresponding to viewability; and estimate a third outcome score corresponding to brand lift. The computer system can store the first, second, and third outcome scores in a first set of outcome scores associated with the first slot. Then, in response to the first target outcome, in the first set of outcome scores, exceeding the second and third outcome scores, the computer system can assign the first target outcome of VCR to the first slot. The computer system can then identify a visual media and/or campaign designating VCR as the target outcome for this visual media and/or campaign.

In one variation, the computer system can leverage webpage data (e.g., owned by the publisher) to predict outcome scores for slots. For example, in response to receiving identification of a first slot loaded within a first webpage accessed at a computing device (e.g., mobile computing device), the computer system can: receive a first set of slot characteristics including a first address associated with the first webpage; and access a first set of webpage data, stored in a webpage container, corresponding to the first webpage based on the first address, the first set of webpage data including webpage metadata (e.g., title, description, related concepts) and/or historical engagement data (e.g., historical slot characteristics, historical outcome) associated with visual media rendered within the first webpage. The computer system can then: access a catalog of visual media assigned to the first webpage; access a model associating slot characteristics and webpage data to a set of target outcomes of visual media in the catalog of visual media; and, for each target outcome in the set of target outcomes, estimate an outcome score for the first slot based on the first set of slot characteristics, the first set of webpage data, and the outcome model. Therefore, in this example, the computer system can leverage webpage data stored for the first webpage, to modify the outcome model to more accurately predict outcome scores for the first slot loaded on this particular webpage.

In the preceding example, the computer system can update the webpage data stored for the first webpage based on the first set of slot characteristics and outcomes associated with presenting visual media in the first slot. For example, in response to serving a first visual media in the first slot for presentation to the user within the first webpage, the computer system can: receive a first set of engagement data (e.g., quantity of clicks, quantity of scrolls, duration of view, proportion of visual media visible within a display of the computing device); and, for each target outcome in the set of target outcomes, calculate an actual outcome score for the first slot based on the first set of engagement data. In particular, for a target outcome of viewability, the computer system can calculate an actual viewability score for visual media presented within the first slot based on a proportion of a visual media visible within a display of the computing device and a duration of time the proportion of the visual media was visible within the display. The computer system can similarly calculate actual outcome scores for each additional target outcome, in the set of target outcomes. The computer system can then: compile the first set of slot characteristics, the first set of outcome scores (e.g., initially predicted outcome scores), and the first set of actual outcome scores into a first slot container representative of the first slot; and insert the first slot container into the webpage container associated with the first webpage.

The computer system can similarly modify or mask the outcome model based on recorded slot characteristics and engagement data (e.g., interaction data, outcome data) stored for a particular webpage, a particular visual media, a particular campaign, and/or a particular visual media format.

In one variation, the computer system can calculate an outcome score given a particular target outcome, based on characteristics of a query received from a particular slot. For example, the computer system can: receive a query for a visual media from a computing device associated with a user; access an outcome model linking slot characteristics to target outcomes of campaigns; calculate a first outcome score for a first target outcome based on the outcome model and characteristics of the query; and, in response to the first outcome score exceeding a threshold outcome score, select a first visual media designating the first target outcome as its target outcome. Alternatively, in response to the first outcome score falling below the threshold outcome score, the computer system can: calculate a second outcome score for a second target outcome; and in response to the second target outcome exceeding the threshold outcome score select a second visual media designating the second target outcome as its target outcome. The computer system can iterate this process to find a particular target outcome with a high outcome score for this query from this particular slot, and therefore match this slot with a visual media that the user is likely to engage with according to the target outcome specified by the visual media.

In another variation, the computer system can calculate an outcome score given a particular visual media. In this variation, the computer system can input data from a user's device (e.g., slot characteristics) and/or visual media metadata (e.g., content, format, brand, product) for the particular visual media into the outcome model. For example, given a particular target outcome, the computer system can select a particular visual media designating this particular target outcome that is most likely to yield a high degree of user engagement and achieve the target outcome. In this example, the computer system can implement the outcome model to: calculate a first outcome score for a first visual media designating the particular target outcome based on slot characteristics and visual media metadata of the first visual media; calculate a second outcome score for a second visual media designating the particular target outcome based on slot characteristics and visual media metadata of the second visual media; and calculate a third outcome score for a third visual media designating the particular target outcome based on slot characteristics and visual media metadata of the third visual media. Given these three outcome scores, the computer system can select the visual media corresponding to the greatest outcome score.

Alternatively, the computer system can calculate weighted outcome scores, based on bidding values provided by brands for particular impressions (or e.g., queries). Alternatively, the computer system can calculate a set of visual media scores, each visual media score in the set of visual media scores corresponding to a visual media, and weight each of these visual media scores according to an impression value assigned to the visual media. Thus, if the computer system calculates the first visual media score as 85.0% and the first visual media specifies a first impression value of $0.30, the computer system can calculate a first weighted visual media score of 25.5%. For a second visual media, the computer system can calculate a second visual media score of 60%, based on the outcome model, the set of slot characteristics, and the set of visual media characteristics. If the second visual media specifies a second impression value of $0.60, the computer system can calculate a second weight visual media score of 36.0%. The computer system can then select the second visual media instead of the first visual media, based on the first and second weighted visual media scores, and serve the second visual media in the first slot on the first webpage, to the user.

In one variation, a publisher can—in combination with the computer system—implement the outcome model to predict a single outcome score for each query received (e.g., a viewability score, a VCR score, a composite outcome score representative of all interaction types) and rank each query received according to its corresponding outcome score. The computer system can then match each query to a visual media according to an impression value assigned to each visual media available to the publisher by the publisher and/or by the brand.

In one implementation, the computer system can implement the outcome model to predict outcome scores for multiple slots loaded into a single webpage or across multiple webpages. For example, at a first time, in response to receiving identification (e.g., via a computer network) of a first slot loaded within a first webpage accessed at a computing device associated with a user, the computer system can: receive a first set of slot characteristics including an address (e.g., URL) of the first webpage, a location (e.g., vertical and/or lateral position) of the first slot within the first webpage, and/or a size (e.g., dimensions) of the first slot; and access a set of webpage data (e.g., webpage metadata, historical engagement data associated with the first webpage) corresponding to the first webpage (e.g., stored in a webpage container). The computer system can then calculate a first set of outcome scores for the first slot based on the first set of slot characteristics, the set of webpage data, and the outcome model, each outcome score corresponding to a particular target outcome, in a set of target outcomes of visual media in campaigns assigned to this webpage (e.g., contracted with the publisher). Additionally, in response to receiving identification (e.g., via a computer network) of a second slot loaded within the first webpage accessed at the computing device, the second slot below the first slot within the first webpage, the computer system can receive a second set of slot characteristics including the address (e.g., URL), a location (e.g., vertical and/or lateral position) of the second slot within the second webpage, and/or a size (e.g., dimensions) of the second slot. The computer system can then calculate a second set of outcome scores for the second slot based on the second set of slot characteristics, the set of webpage data, and the outcome model, each outcome score corresponding to a particular target outcome, in the set of target outcomes. The computer system can identify a particular target outcome that the user is most likely to achieve for each slot loaded within this first webpage. In particular, in this example, the computer system can: identify a first outcome score, in the first set of outcome scores, corresponding a first target outcome of VCR, exceeding each other outcome score in the first set of outcome scores; and identify a second outcome score, in the second set of outcome scores, corresponding to a second target outcome of viewability, exceeding each other outcome score in the second set of outcome scores. Then, the computer system can: access a set of campaigns available to the publisher for slots on the first webpage; identify a first campaign specifying the first target outcome of VCR for visual media in the first campaign; select a first visual media from the first campaign for presentation within the first slot; identify a second campaign specifying the second target outcome of viewability for visual media in the second campaign; and select a second visual media from the second campaign for presentation within the second slot.

In another example, the computer system can leverage outcome scores of each slot (e.g., loaded within a single webpage) to identify best combinations of visual media and slots. In particular, in the preceding example, for the first slot, the computer system can predict: a first outcome score of 90% for the first target outcome of VCR; and a second outcome score of 70% for viewability. Then, for the second slot, the computer system can predict: a third outcome score of 80% for the first target outcome of VCR; and a fourth outcome score of 60% for the second outcome score of viewability. The computer system can then access a catalog of visual media assigned to the first webpage to select a visual media for presentation within each slot. In this example, in response to the catalog including a first visual media designating VCR as the target outcome and a second visual media designating viewability as the target outcome, the computer system can: predict a first combination outcome score corresponding to the first visual media, presented within the first slot, and the second visual media, presented within the second slot, based on a combination (e.g., product, sum, average) of the first outcome score and the fourth outcome score; and predict a second combination outcome score corresponding to the second visual media, presented within the first slot, and the first visual media, presented within the second slot, based on a combination (e.g., product, sum, average) of the second outcome score and the third outcome score. In particular, in this example, the computer system can: calculate a first product of the first outcome score of 90% (e.g., for the first target outcome of VCR) and the fourth outcome score of 60% (e.g., for the second target outcome of viewability) to predict a first combination outcome score of 54%; and calculate a second product of the second outcome score of 70% (e.g., for the second target outcome of viewability) and the third outcome score of 80% (e.g., for the first outcome score of VCR) to predict a second combination outcome score of 56%. Then, in response to the second combination outcome score exceeding the first combination outcome score, the computer system can: assign the second visual media, designating the second target outcome of viewability, to the first slot; and assign the first visual media, designating the first target outcome of VCR, to the second slot. Therefore, a publisher—in combination with the computer system—can leverage these combination outcome scores to enable load balancing of available visual media and/or campaigns, while maximizing overall likelihood of achieving target outcomes of these visual media and/or campaigns.

12. Brand Tool

In one implementation, the computer system can execute Blocks of the method S100 to assist a brand in targeting visual media toward impressions (e.g., queries or slots) that are more likely to achieve a particular target outcome as specified by visual media or campaigns associated with the brand. However, the computer system can similarly execute Blocks of the method S100 to assist a publisher, a campaign, or any other entity in targeting visual media toward impressions that are more likely to achieve a particular target outcome.

In one variation, the computer system can calculate a value of an impression given a particular target outcome assigned by the brand. For example, during a visual media auction, a brand may bid on a particular slot located on a webpage accessed by a computing device (e.g., desktop computer) of a user. If the brand wins the visual media auction, the computer system can—on behalf of the brand—implement the outcome model to select a particular visual media for placement in the slot that is most likely to yield the user's attention and a high level of engagement according to a target outcome defined by the particular visual media.

In one implementation, the computer system can leverage stored visual media characteristics (e.g., visual media metadata, format, subject, historical engagement data) to identify a particular visual media, in a campaign, for presentation within a particular slot. In particular, the computer system can calculate an outcome score for visual media in a campaign to inform selection of a visual media for presentation within a particular slot.

For example, at a first time, a campaign may define a minimum video completion rate as a target outcome for a set of visual media, in the campaign (e.g., via an instance of a brand portal). Later, in response to receiving identification of a first slot loaded within a first webpage accessed at a computing device associated with a user, the computer system can: receive a first set of slot characteristics (e.g., a first address of the first webpage, a first location of the first slot within the first webpage, a time of day at which the first slot was loaded into the first webpage, a type of device accessing the first slot) corresponding to the first slot; and access a model associating slot characteristics and user interactions with the set of visual media in the first campaign. Then, for a first visual media, in the first campaign, the computer system can: access a first set of visual media characteristics stored in a first visual media container corresponding to the first visual media; and predict a first outcome score for the first visual media based on the first set of slot characteristics, the first set of visual media characteristics and the outcome model, the first outcome score representing a probability of the user interacting with the first visual media, presented within the first slot, according to the minimum video completion rate defined by the campaign. Then, in response to the first outcome score for the first visual media exceeding a threshold outcome score, the computer system can select (e.g., flag) the first visual media for presentation within the first slot accessed by the computing device.

However, in the preceding example, in response to the first outcome score falling below the threshold outcome score, the computer system can: withhold the first visual media from presentation within the first slot; and select a second visual media, in the campaign, for presentation within the first slot. In particular, the computer system can: access a second set of visual media characteristics stored in a second visual media container corresponding to the second visual media; and predict a second outcome score for the second visual media, based on the second set of slot characteristics, the second set of visual media characteristics and the outcome model, the second outcome score representing a probability of the user interacting with the second visual media, presented within the first slot, according to the minimum video completion rate defined by the first campaign. In response to the second outcome score exceeding the threshold outcome score, the computer system can select (e.g., flag) the second visual media for presentation within the first slot. However, if the second outcome falls below the threshold outcome score, then the computer system can reiterate this process for subsequent visual media, in the campaign, until identifying a visual media predicted to achieve the minimum video completion rate.

Additionally and/or alternatively, for each visual media in the campaign, the computer system can: access a set of visual media characteristics stored in a visual media container corresponding to the visual media; and predict an outcome score for the visual media, based on the set of slot characteristics, the set of visual media characteristics and the outcome model, the outcome score representing a probability of the user interacting with the visual media, presented within the first slot, according to the minimum video completion rate defined by the first campaign. The computer system can then: rank each visual media, in the campaign, according to target outcome; and select a particular visual media, in the campaign, corresponding to the highest target outcome. In particular, in the preceding example, the computer system can predict the first outcome score for the first visual media and the second outcome score for the second visual media as described. Then, in response to the first outcome score exceeding the second outcome score, the computer system can select the first visual media for presenting within the first slot. Alternatively, in response to the second outcome score exceeding the first outcome score, the computer system can select the second visual media for presenting within the first slot.

In one variation, the computer system can estimate a value of an impression to the brand, and suggest this value to the brand for bidding during a visual media auction. For example, for a particular impression corresponding to a slot on a webpage accessed by a mobile device of a user, the computer system can implement the outcome model to calculate an outcome score of 95% for VCR. Based on this outcome score, the computer system can calculate a value of this impression for a particular campaign of this brand and/or for a particular visual media. In this example, if a first campaign of the brand includes all video visual media, the computer system can calculate a high value for this impression for the first campaign of this brand. The brand can then bid in the visual media auction based on the value provided by the computer system. Alternatively, the computer system can automatically bid this value for the particular impression on behalf of the brand.

13. Online Exchange Platform

In one implementation, the computer system can be configured to interface with an online exchange platform to enable matching of visual media and/or campaigns to available slots in (near) real-time. In particular, in this implementation, the computer system can: receive queries for visual media for available slots loaded into webpages, accessed by a population of computing devices, via instances of a publisher portal; implement methods and techniques described above to identify target outcomes, visual media formats, particular visual media and/or campaigns, best matched to these slots; and transmit this information to brands—via instances of a brand portal—to enable real-time bidding for these slots based on this information. The computer system can therefore execute Blocks of the method S100 in (near) real-time, such that visual media (e.g., a visual media) is loaded within a slot for viewing by a user prior to a webpage—including the slot—finishing loading on the user's computing device.

For example, the computer system can receive identification of a first slot loaded within a first webpage from a publisher, associated with the first webpage, via a first instance of a publisher portal. The computer system can then: access a first set of slot characteristics, such as an address (e.g., URL) associated with the first webpage, a location (e.g., upper, middle, lower, left, right) of the first slot within the first webpage, a time of day associated with loading of the first slot, a set of device characteristics (e.g., type of device, geographic location), and/or a set of webpage characteristics associated with the first webpage (e.g., webpage metadata); and access a set of outcome models associating slot characteristics and user interactions with visual media, each outcome model corresponding to a target outcome, in a set of target outcomes, of visual media (e.g., defined by campaigns).

Then, for each target outcome, in the set of target outcomes, the computer system can: calculate an outcome score for the first slot based on the first set of slot characteristics and the outcome model, the outcome score representing a likelihood of the user interacting with visual media, presented within the first slot, according to the target outcome; and insert the target outcome into a first outcome index sorted according to the outcome score. More specifically, in this example, the computer system can: access a viewability model to calculate a viewability score for the first slot based on the first set of visual media characteristics; access a VCR model to calculate a VCR score for the first slot based on the first set of visual media characteristics; access a brand lift model to calculate a brand lift score for the first slot based on the first set of visual media characteristics; and so on. The computer system can then: compile the set of target outcomes and corresponding outcome scores (e.g., the viewability score, the VCR score, the brand lift score) into the first outcome index, sorted according to outcome score (e.g., ranked from highest score to lowest score), for the first slot; and publish the first outcome index to an online exchange platform (e.g., a real-time bidding visual media exchange). Brands may then leverage this first outcome index—accessible via instances of a brand portal—to inform bidding on the first slot.

In one variation, upon receiving identification of a slot from an instance of the publisher portal and characterizing the slot (e.g., based on slot characteristics), the computer system can serve the slot to instances of the brand portal. In particular, the computer system can sort the slot into a catalog that is searchable within the brand portal. For example, a brand may access the catalog of slots via an instance of the brand portal and select to view only a subset of slots, in the catalog of slots, predicted to achieve a particular target outcome. Alternatively, the brand may access the catalog and select to view a different subset of slots accessed by mobile devices in a particular geographic region. Therefore, the computer system can enable brands to rapidly identify slots relevant to a particular visual media or campaign and to sort slots based on preferences of the brand.

In one implementation, the computer system can rank slots for each visual media and/or campaign, live on the online exchange platform, and serve these ranked slots to brands associated with these visual media and/or campaigns. Alternatively, in another implementation, the computer system can rank all slots for each visual media and/or campaign, live on the online exchange platform, and then serve different sets of these ranked slots to different brands based on rank. For example, the computer system can rank all available slots for a campaign associated with a particular brand, and serve only the top 100 slots—sorted by rank (e.g., by outcome score, based on a particular parameter specified by the brand)—to the particular brand via an instance of the brand portal.

In one implementation, the computer system can automatically push a particular slot to a target group of brands based on slot characteristics, characteristics of campaigns and/or visual media within visual media campaigns, and/or slot parameters defined by brands. For example, the computer system can: receive identification of a slot loaded within a webpage; receive a set of slot characteristics corresponding to the slot; calculate a first outcome score (e.g., VCR score) for a first target outcome (e.g., VCR) for the slot based on the set of slot characteristics and the outcome model. Then, the computer system can: isolate a set of campaigns, in a set of campaigns live within the online exchange platform, each campaign, in the set of campaigns, designating the first target outcome; and distribute the first slot—including the first outcome score for the first target outcome—to brands associated with each campaign, in the set of campaigns, via instances of the brand portal. The computer system can then repeat this process for each target outcome in the first set of target outcomes. Additionally and/or alternatively, for each campaign, in the set of campaigns, the computer system can: access a threshold outcome score defined by the campaign; and, in response to the first outcome score exceeding the threshold outcome score, serve the first slot to an instance of the visual media portal associated with the campaign. Alternatively, in response to the first outcome score falling below the threshold outcome score defined by the campaign, the computer system can withhold the first slot from the instance of the brand portal associated with the campaign. Therefore, the computer system can similarly withhold particular slots from brands based on slot parameters (e.g., a threshold outcome score, a particular device type, a particular geographic region).

The computer system can streamline connecting visual media and/or visual media campaigns (e.g., managed by brands) to slots (e.g., managed by publishers) based on slot characteristics which may fit certain criteria for these visual media and/or campaigns, such as histories of high user engagement according to particular target outcome in slots exhibiting similar slot characteristics. More specifically, the computer system can execute Blocks of the method S100 to filter, rank, or prioritize slots served to brands based on slots most relevant to visual media and/or visual media campaigns associated with these brands, thereby: minimizing latency between generation of a query for visual media in a slot and loading of a visual media within the slot; increasing success of visual media and/or campaigns by promoting slots best matched to these visual media and/or campaigns; reducing costs to brands by enabling brands to bid on fewer slots in order to achieve target outcomes of campaigns; enabling brands to bid relatively higher values for high-value slots (e.g., for a particular visual media or campaign) by minimizing bid placement on lower-value slots; and increasing revenue for publishers by enabling brands to bid higher values for these high-value slots.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a computer system, during a first time period:
      at a first time, via a computer network, receiving identification of a first slot loaded within a first electronic document accessed by a first computing device remote from the computer system, the first slot remaining outside a first viewing window of the first computing device and loaded with a first default visual media at the first time;
      characterizing a first set of features representative of the first slot and comprising a first address associated with the first electronic document and a first set of device characteristics associated with the first computing device;
      representing characteristics of the first set of features in a first feature container associated with the first slot;
      characterizing a first difference between the first feature container and a first group of feature containers representing target combinations of feature characteristics predicted to anticipate a first target outcome, in a set of target outcomes, defined for a first campaign; and
      retrieving an outcome model associating feature containers with a set of target outcomes of consumption of visual media;
      for a first target outcome, in the set of target outcomes, predicting a first outcome score based on the first difference and the outcome model, the first outcome score representing a likelihood of user interactions with visual media presented within the first slot corresponding to the first target outcome;
      in response to the first outcome score exceeding a threshold outcome score, selecting a first visual media, in the first campaign, for presentation within the first slot in replacement of the first default visual media; and
      serving the first visual media to the first computing device for rendering within the first slot prior to an event that locates the first slot in the first viewing window of the first computing device; and
   at the computer system, during a second time period:
      at a second time, via the computer network, receiving identification of a second slot loaded within a second electronic document accessed by a second computing device remote from the computer system, the second slot remaining outside a viewing window of the second computing device and loaded with a second default visual media at the second time;
      characterizing a second set of features representative of the second slot and comprising a second address associated with the second electronic document and a second set of device characteristics associated with the second computing device;
      representing characteristics of the second set of features in a second feature container associated with the second slot;
      characterizing a second difference between the second feature container and the first group of feature containers, the second difference exceeding the first difference;
      for the first target outcome, predicting a second outcome score based on the second difference and the outcome model, the second outcome score representing a likelihood of user interactions with visual media presented within the second slot corresponding to the first target outcome; and
      in response to the second outcome score falling below the threshold outcome score, rejecting the first visual media for presentation within the second slot.

2. The method of claim 1, wherein rejecting the first visual media for presentation within the second slot further comprises:
   characterizing a third difference between the second feature container and a second group of feature containers representing target combinations of feature characteristics predicted to anticipate a second target outcome, in the set of target outcomes, defined for a second campaign; and
   based on the third difference:
      selecting a second visual media, in the second campaign defining the second target outcome, for presentation within the second slot in replacement of the second default visual media; and
      serving the second visual media to the second computing device for rendering within the second slot prior to an event that locates the second slot in the second viewing window of the second computing device.

3. The method of claim 1:
further comprising:
  during an initial time period preceding the first time period and the second time period:
    serving a set of visual media to slots loaded within a population of webpages accessed by a population of computing devices of a population of users;
    accessing a corpus of feature data representing characteristics of the population of webpages, the population of computing devices, the population of users, and the set of visual media;
    accessing a corpus of engagement data representing interactions of the population of users with visual media in the set of visual media; and
    deriving the outcome model comprising correlations between user characteristics, characteristics of visual media, characteristics of webpages, and characteristics of user computing devices to the set of target outcomes based on the corpus of engagement data; and
  during a third time period preceding the first time period:
    receiving identification of a second visual media in the first campaign;
    for each webpage, in the population of webpages, calculating a probability of user engagement with the second visual media, presented within a slot on the webpage, corresponding to the first target outcome based on the corpus of feature data, the corpus of engagement data, and the outcome model; and
    flagging a subset of webpages, in the population of webpages, associated with a greatest probability of engagement with the second visual media according to the first target outcome, the subset of webpages comprising the first electronic document; and
  wherein receiving identification of the first slot loaded within the first electronic document accessed by the first computing device and loaded with the first default visual media comprises, in response to receiving a request for visual media from the first computing device for the first slot loaded within the first electronic document, serving the first default visual media comprising the second visual media in the first campaign to the first slot.

4. The method of claim 1:
wherein characterizing the first difference between the first feature container and the first group of feature containers comprises:
  populating a multi-dimensional feature space with a first vertex defined by a first set of coordinates representing the first address and the first set of device characteristics;
  locating a target vertex defined by a target set of coordinates representing the first group of feature containers; and
  estimating a first distance between the first vertex and the target vortex based on the first set of coordinates and the target set of coordinates;
wherein predicting the first outcome score based on the first difference and the outcome model comprises predicting the first outcome score based on the first distance and the outcome model;
wherein characterizing the second difference between the second feature container and the first group of feature containers comprises:
  populating the multi-dimensional feature space with a second vertex defined by a second set of coordinates representing the second address and the second set of device characteristics; and
  estimating a second distance between the second vertex and the target vertex based on the second set of coordinates and the target set of coordinates; and
wherein predicting the second outcome score based on the second difference and the outcome model comprises predicting the second outcome score based on the second distance and the outcome model.

5. The method of claim 1, wherein rejecting the first visual media for presentation within the second slot based on the second difference further comprises:
characterizing a third difference between the second feature container and a second group of feature containers representing target combinations of feature characteristics predicted to anticipate the first target outcome; and
based on the third difference:
  selecting a second visual media, in the first campaign, for presentation within the second slot in replacement of the second default visual media; and
  serving the second visual media to the second computing device for rendering within the second slot, in replacement of the second default visual media, prior to an event that locates the second slot in the viewing window of the second computing device.

6. The method of claim 1:
wherein representing characteristics of the first set of features in the first feature container comprises, for each feature in the first set of features:
  representing characteristics of the feature as a first set of numerical values; and
  storing the first set of numerical values in a first set of slots, within the first feature container, associated with the first feature; and
wherein characterizing the first difference between the first feature container and the first group of feature containers comprises:
  accessing a target feature container defining a second set of slots containing a second set of numerical values representing a target set of features; and
  characterizing the first difference between the first feature container and the target feature container based on the first set of numerical values and the second set of numerical values.

7. The method of claim 1:
wherein selecting the first visual media for presentation within the first slot comprises selecting the first visual media, defining a first responsive format corresponding to the first target outcome, for presentation within the first slot; and
wherein rejecting the first visual media for presentation within the second slot further comprises:
  characterizing a third difference between the second feature container and a second group of feature containers representing target combinations of features predicted to anticipate a second target outcome, in the set of target outcomes, defined by the first campaign;
  based on the third difference, selecting a second visual media, in the first campaign, defining a second responsive format corresponding to the second target outcome for presentation within the second slot; and
  serving the second visual media to the second computing device for rendering within the second slot, in replacement of the second default visual media, prior to an event that locates the second slot in the viewing window of the second computing device.

8. The method of claim 7:
wherein serving the first visual media to the first computing device for rendering within the first slot comprises serving the first visual media of the first responsive format to the first computing device for rendering within the first slot comprising:
 rendering a first frame, in a sequence of frames, of a digital video within the first slot;
 at a third time succeeding the first time, in response to the event that locates the first slot within the viewing window of the first computing device, initiating forward playback of the digital video from the first frame; and
 at a fourth time succeeding the third time, in response to a second event that locates the first slot outside the viewing window of the first computing device, pausing playback of the digital video at a second frame, in the sequence of frames, succeeding the first frame.

9. The method of claim 7:
wherein selecting the first visual media defining the first responsive format corresponding to the target outcome comprises selecting the first visual media defining the first responsive format corresponding to the target outcome comprising a target click-through rate; and
wherein selecting the second visual media defining the second responsive format corresponding to the second target outcome comprises selecting the second visual media defining the second responsive format corresponding to second the target outcome comprising a target viewability.

10. The method of claim 1:
further comprising, during an initial time period preceding the first time period and the second time period:
 serving visual media in slots inserted into a population of electronic documents accessed by computing devices associated with a population of users;
 for each instance of a visual media served to a slot, loaded within an electronic document, in the population of electronic documents, accessed by a computing device of a user, in the population of users, during the initial time period:
  characterizing a set of features, representative of the instance of the visual media served to the slot, comprising:
   a set of user characteristics corresponding to the user;
   a set of device characteristics corresponding to the computing device;
   a set of webpage characteristics corresponding to the electronic document;
   a set of media characteristics corresponding to the visual media; and
   a set of engagement data representing user interactions with the visual media presented within the slot loaded within the electronic document; and
  representing the set of features and the set of engagement data in a feature container, in a population of feature containers, associated with the instance of the visual media served to the slot; and
 generating the outcome model linking characteristics of the set of features to target outcomes of visual media based on the population of feature containers.

11. The method of claim 1:
further comprising, during an initial time period:
 defining a multi-dimensional feature space; and
 for each user in a test population of users:
  accessing a set of engagement data representing historical interactions of the user with visual media in the first campaign;
  representing the set of engagement data in a test session container;
  projecting the test session container within the multi-dimensional feature space; and
  in response to the set of engagement data corresponding to the first target outcome defined by the first campaign, associating a target location of the test session container, within the multi-dimensional feature space, with the first target outcome; and
wherein predicting the first outcome score based on the first difference and the outcome model comprises:
 projecting the first feature container into the multi-dimensional feature space;
 predicting the first outcome score based on the outcome model and a first location of the first feature container falling within a threshold distance of the target location within the multi-dimensional feature space.

12. The method of claim 1:
wherein receiving identification of the first slot comprises receiving identification of the first slot loaded within the first electronic document containing:
 the first slot remaining outside the viewing window at the first time; and
 a third slot located within the viewing window of the first computing device at the first time and loaded with a second visual media in the first campaign;
further comprising, accessing a first set of engagement data representing user interactions with the second visual media presented in the third slot;
wherein representing characteristics of the first set of features in the first feature container further comprises representing characteristics of the first set of features and the first set of engagement data in the first feature container;
wherein receiving identification of the second slot comprises receiving identification of the second slot loaded within the second electronic document containing:
 the second slot remaining outside the viewing window at the second time; and
 a fourth slot located within the viewing window of the second computing device at the second time and loaded with a third visual media in the first campaign;
further comprising, accessing a second set of engagement data representing user interactions with the third visual media presented in the fourth slot; and
wherein representing characteristics of the second set of features in the second feature container further comprises representing characteristics of the second set of features and the second set of engagement data in the second feature container.

* * * * *